(12) United States Patent
Kobayashi et al.

(10) Patent No.: US 10,000,108 B2
(45) Date of Patent: Jun. 19, 2018

(54) REFRIGERATION CYCLE DEVICE

(71) Applicant: DENSO CORPORATION, Kariya, Aichi-pref. (JP)

(72) Inventors: Hiroyuki Kobayashi, Kariya (JP); Atsushi Yamada, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 340 days.

(21) Appl. No.: 14/783,963

(22) PCT Filed: Apr. 9, 2014

(86) PCT No.: PCT/JP2014/002026
§ 371 (c)(1),
(2) Date: Oct. 12, 2015

(87) PCT Pub. No.: WO2014/171107
PCT Pub. Date: Oct. 23, 2014

(65) Prior Publication Data
US 2016/0068047 A1 Mar. 10, 2016

(30) Foreign Application Priority Data

Apr. 18, 2013 (JP) .................................. 2013-087610

(51) Int. Cl.
*B60H 1/32* (2006.01)
*F25B 5/04* (2006.01)
(Continued)

(52) U.S. Cl.
CPC ....... *B60H 1/3223* (2013.01); *B60H 1/00921* (2013.01); *B60H 1/3213* (2013.01);
(Continued)

(58) Field of Classification Search
CPC ............ B60H 1/00807; B60H 1/00885; F25B 2500/02; F25B 2600/2509;
(Continued)

(56) References Cited

U.S. PATENT DOCUMENTS 5,704,219 A * 1/1998 Suzuki ............... B60H 1/00907
237/2 B
5,778,691 A * 7/1998 Suzuki ............... B60H 1/00907
62/160
(Continued)

FOREIGN PATENT DOCUMENTS

JP H10038389 A 3/1998
JP 2006044607 A 2/2006
(Continued)

OTHER PUBLICATIONS

International Search Report and Written Opinion (in Japanese with English Translation) for PCT/JP2014/002026, dated Jun. 17, 2014; ISA/JP.

*Primary Examiner* — Elizabeth Martin
*Assistant Examiner* — Zachary R Anderegg
(74) *Attorney, Agent, or Firm* — Harness, Dickey & Pierce, P.L.C.

(57) ABSTRACT

A refrigeration cycle device includes an interior condenser that exchanges heat between a high-pressure refrigerant and ventilation air to heat the ventilation air, an exterior heat exchanger that exchanges heat between outside air and the refrigerant downstream of the interior condenser, an interior evaporator that exchanges heat between a low-pressure refrigerant downstream of the exterior heat exchanger and the ventilation air before passing through the interior condenser, and an internal heat exchanger that exchanges heat between the refrigerant flowing out of the exterior heat exchanger and the refrigerant flowing out of the interior evaporator. The refrigeration cycle device further includes a
(Continued)

gas-liquid separator that separates the refrigerant at a downstream side of the interior condenser into gas and liquid phase refrigerants. In a dehumidification heating mode of evaporating the refrigerant at the exterior heat exchanger, the liquid-phase refrigerant separated by the gas-liquid separator flows into the exterior heat exchanger.

8 Claims, 7 Drawing Sheets

(51) Int. Cl.
- *F25B 49/02* (2006.01)
- *F25B 40/00* (2006.01)
- *F25B 6/04* (2006.01)
- *B60H 1/00* (2006.01)

(52) U.S. Cl.
CPC .......... *F25B 5/04* (2013.01); *F25B 6/04* (2013.01); *F25B 49/02* (2013.01); *F25B 40/00* (2013.01); *F25B 2341/0662* (2013.01); *F25B 2400/23* (2013.01); *F25B 2600/2509* (2013.01); *F25B 2600/2513* (2013.01); *F25B 2700/195* (2013.01); *F25B 2700/21163* (2013.01)

(58) Field of Classification Search
CPC .. F25B 2700/21175; F25B 2700/21163; F25B 6/04
USPC .................................................. 62/202, 239
See application file for complete search history.

(56) References Cited

U.S. PATENT DOCUMENTS

| | | | | |
|---|---|---|---|---|
| 5,927,088 | A * | 7/1999 | Shaw | F25B 1/10 62/175 |
| 6,293,123 | B1 * | 9/2001 | Iritani | B60H 1/3205 62/197 |
| 2004/0079096 | A1 | 4/2004 | Itoh et al. | |
| 2007/0074538 | A1 | 4/2007 | Kurata et al. | |
| 2011/0113808 | A1 * | 5/2011 | Ko | F25B 1/04 62/324.3 |
| 2012/0255319 | A1 | 10/2012 | Itoh et al. | |
| 2012/0266622 | A1 * | 10/2012 | Inaba | B60H 1/00899 62/186 |
| 2012/0266624 | A1 | 10/2012 | Inaba et al. | |
| 2013/0055751 | A1 | 3/2013 | Inaba | |
| 2014/0238067 | A1 * | 8/2014 | Itou | F25B 41/04 62/324.6 |
| 2015/0159933 | A1 | 6/2015 | Itoh et al. | |
| 2016/0236538 | A1 * | 8/2016 | Suzuki | B60H 1/00921 |

FOREIGN PATENT DOCUMENTS

| | | |
|---|---|---|
| JP | 3841039 B2 | 11/2006 |
| JP | 2007071461 A | 3/2007 |
| JP | 2012225637 A | 11/2012 |
| JP | 2012233676 A | 11/2012 |
| JP | 2013068407 A | 4/2013 |

* cited by examiner (FIRST DEHUMIDIFICATION HEATING MODE)

(SECOND DEHUMIDIFICATION HEATING MODE)

REFRIGERATION CYCLE DEVICE

CROSS REFERENCE TO RELATED APPLICATIONS

This application is a U.S. National Phase Application under 35 U.S.C. 371 of International Application No. PCT/JP2014/002026 filed on Apr. 9, 2014 and published in Japanese as WO 2014/171107 A1 on Oct. 23, 2014. This application is based on and claims the benefit of priority from Japanese Patent Application No. 2013-087610 filed on Apr. 18, 2013. The entire disclosures of all of the above applications are incorporated herein by reference.

FIELD OF THE INVENTION

The present disclosure relates to refrigeration cycle devices to be applied to air conditioners that dehumidify a space to be air-conditioned.

BACKGROUND ART

Conventionally, as disclosed in Patent Document 1, a refrigeration cycle device has been proposed that is applied to air conditioners for vehicles and which can be configured to switch a refrigerant circuit. Specifically, the refrigeration cycle device is capable of switching among a refrigerant circuit for an air cooling mode of cooling the vehicle interior as a space to be air-conditioned, a refrigerant circuit for an air heating mode of heating the vehicle interior, and a refrigerant circuit for a dehumidification heating mode of heating and dehumidifying the vehicle interior.

More specifically, the refrigeration cycle device described in Patent Document 1 has a plurality of heat exchangers, including an interior condenser, an exterior heat exchanger, and an interior evaporator. The interior condenser exchanges heat between ventilation air and a high-temperature and high-pressure refrigerant discharged from a compressor. The exterior heat exchanger exchanges heat between the outside air and a refrigerant on the downstream side of the interior condenser. The interior evaporator exchanges heat between the ventilation air and a low-pressure refrigerant on the downstream side of the exterior heat exchanger.

In the air cooling mode, the refrigeration cycle device switches to the refrigerant circuit that evaporates the refrigerant at the interior evaporator while dissipating heat from the refrigerant at the exterior heat exchanger. In the air heating mode, the refrigeration cycle device switches to the refrigerant circuit that evaporates the refrigerant at the exterior heat exchanger while dissipating heat from the refrigerant at the interior condenser.

Further, in the dehumidification heating mode, the refrigeration cycle device switches to the refrigerant circuit that evaporates the refrigerant at the interior evaporator while dissipating heat from the refrigerant at both the interior condenser and the exterior heat exchanger. Thus, in the dehumidification heating mode, the ventilation air cooled and dehumidified by the interior evaporator is reheated by the interior condenser to achieve the dehumidification heating of the vehicle interior.

The refrigeration cycle device disclosed in Patent Document 1 further includes an internal heat exchanger that exchanges heat between the refrigerant flowing out of the exterior heat exchanger and the refrigerant flowing out of the interior evaporator.

In the air cooling mode and the dehumidification heating mode, the internal heat exchanger exchanges heat between the high-pressure refrigerant flowing out of the exterior heat exchanger and the low-pressure refrigerant flowing out of the interior evaporator. Thus, a difference in enthalpy (refrigeration capacity) between the refrigerant at the outlet side of the interior evaporator and the refrigerant at the inlet side thereof is increased to improve the coefficient of performance (COP) of the cycle.

RELATED ART DOCUMENT

Patent Document

[Patent Document 1] Japanese Patent Publication No. 3841039

SUMMARY OF INVENTION

As a result of studies by the inventors of the present application, it has been revealed that the refrigeration cycle device of Patent Document 1 allows the refrigerant to dissipate heat at both the interior condenser and the exterior heat exchanger in the dehumidification heating mode. Thus, in the dehumidification heating mode, the amount of heat usable for heating the ventilation air at the interior condenser is the total of the amount of heat absorbed by the interior evaporator and a compression workload of the compressor.

Refrigeration cycle devices for use in general vehicle air conditioners are designed to control the refrigerant evaporation temperature at the interior evaporator to be at least 0° C. or more in order to prevent frost formation (frost) on the interior evaporator.

Thus, for example, if the outside air at a low temperature is introduced as the ventilation air when the outside air temperature is low, a difference between the refrigerant evaporation temperature at the interior evaporator and the temperature of the ventilation air might be reduced to decrease the amount of heat absorbed by the refrigerant at the interior evaporator. As a result, in the dehumidification heating mode at the low outside air temperature, the ventilation air cannot be sufficiently heated by the interior condenser.

From this viewpoint, there is proposed means for sufficiently heating the ventilation air by evaporating refrigerant at the exterior heat exchanger and then using the heat absorbed by the refrigerant from the outside air at the exterior heat exchanger to heat the ventilation air even in the dehumidification heating mode.

However, when the refrigerant is evaporated by the exterior heat exchanger, the dryness of refrigerant flowing out of the exterior heat exchanger might be increased, compared to when the refrigerant dissipates its heat. Like the refrigeration cycle device disclosed in Patent Document 1, the structure that allows the refrigerant leaving the exterior heat exchanger to flow into the internal heat exchanger might increase the pressure loss when the refrigerant circulates through the internal heat exchanger.

Thus, the refrigerant evaporation temperature at the exterior heat exchanger might become higher than the refrigerant evaporation temperature at the interior evaporator, whereby the refrigerant fails to sufficiently absorb heat from the outside air at the exterior heat exchanger. As a result, in the dehumidification heating mode, the ventilation air cannot be sufficiently heated, even though the refrigerant is evaporated by the exterior heat exchanger.

In view of the foregoing matter, it is an object of the present disclosure to provide a refrigeration cycle device with an internal heat exchanger, which improves a heating capacity for ventilation air when performing dehumidification heating of a space to be air-conditioned.

According to an aspect of the present disclosure, a refrigeration cycle device includes: a compressor adapted to compress and discharge a refrigerant; a refrigerant radiator that exchanges heat between a high-pressure refrigerant discharged from the compressor and ventilation air to be blown into a space to be air-conditioned, to heat the ventilation air; a first decompression device adapted to decompress the refrigerant flowing out of the refrigerant radiator; an exterior heat exchanger that exchanges heat between the refrigerant downstream of the first decompression device and outside air; a second decompression device adapted to decompress the refrigerant flowing out of the exterior heat exchanger; and an evaporator that exchanges heat between a low-pressure refrigerant on a downstream side of the second decompression device and the ventilation air before being heated by the refrigerant radiator, to cool the ventilation air. Furthermore, the refrigeration cycle device is provided with an internal heat exchanger and a gas-liquid separator. The internal heat exchanger exchanges heat between the refrigerant circulating through a refrigerant flow path leading from a refrigerant outlet side of the exterior heat exchanger to an inlet side of the second decompression device, and the refrigerant circulating through another refrigerant flow path leading from a refrigerant outlet side of the evaporator to a side of a suction port of the compressor. The gas-liquid separator separates the refrigerant flowing out of the first decompression device into gas and liquid phase refrigerants. In addition, a liquid-phase refrigerant outlet of the gas-liquid separator is connected to a refrigerant inlet side of the exterior heat exchanger.

Thus, the ventilation air can be cooled and dehumidified by the evaporator, and then the dehumidified ventilation air can be heated by the refrigerant radiator to be blown into a space to be air-conditioned, thereby enabling the dehumidification heating of the space to be air-conditioned.

Further, since the internal heat exchanger is provided, when dissipating heat from the refrigerant at the exterior heat exchanger, the internal heat exchanger can exchange heat between a high-pressure refrigerant flowing out of the exterior heat exchanger and a low-pressure refrigerant flowing out of the evaporator. Thus, a difference in enthalpy (refrigeration capacity) between the refrigerant on the outlet side of the evaporator and the refrigerant on the inlet side thereof can be increased to improve the coefficient of performance (COP) of the cycle.

The liquid-phase refrigerant outlet of the gas-liquid separator is connected to the refrigerant inlet side of the exterior heat exchanger, so that the liquid-phase refrigerant separated by the gas-liquid separator can flow into the exterior heat exchanger. Thus, when the refrigerant is evaporated at the exterior heat exchanger, the dryness of the refrigerant flowing out of the exterior heat exchanger can be prevented from increasing, thereby suppressing an increase in pressure loss that would be caused when the refrigerant flowing out of the exterior heat exchanger circulates through the internal heat exchanger.

Therefore, the increase in refrigerant evaporation temperature at the exterior heat exchanger can be suppressed to thereby increase the amount of heat absorbed by the refrigerant from the outside air in the exterior heat exchanger. As a result, the refrigeration cycle device can improve the heating capacity of the refrigerant radiator for the ventilation air when performing the dehumidification heating of the space to be air-conditioned.

DESCRIPTION OF EMBODIMENTS (First Embodiment)

A first embodiment of the present disclosure will be described below with reference to FIGS. 1 to 7. In this embodiment, a refrigeration cycle device 10 is applied to a vehicle air conditioner 1 for a hybrid vehicle that can obtain the driving force for traveling from both the engine, or the internal combustion engine and an electric motor for traveling. The refrigeration cycle device 10 serves to cool or heat ventilation air to be blown into the vehicle interior as a space to be air-conditioned in the vehicle air conditioner 1.

The refrigeration cycle device 10 of this embodiment can be configured to switch among a refrigerant circuit for an air cooling mode of air-cooling of the vehicle interior by cooling the ventilation air, a refrigerant circuit for an air heating mode of air-heating of the vehicle interior by heating the ventilation air, and refrigerant circuits for first and second dehumidification heating modes of both air-heating and dehumidification of the vehicle interior by heating the ventilation air cooled and dehumidified.

Figure 1:
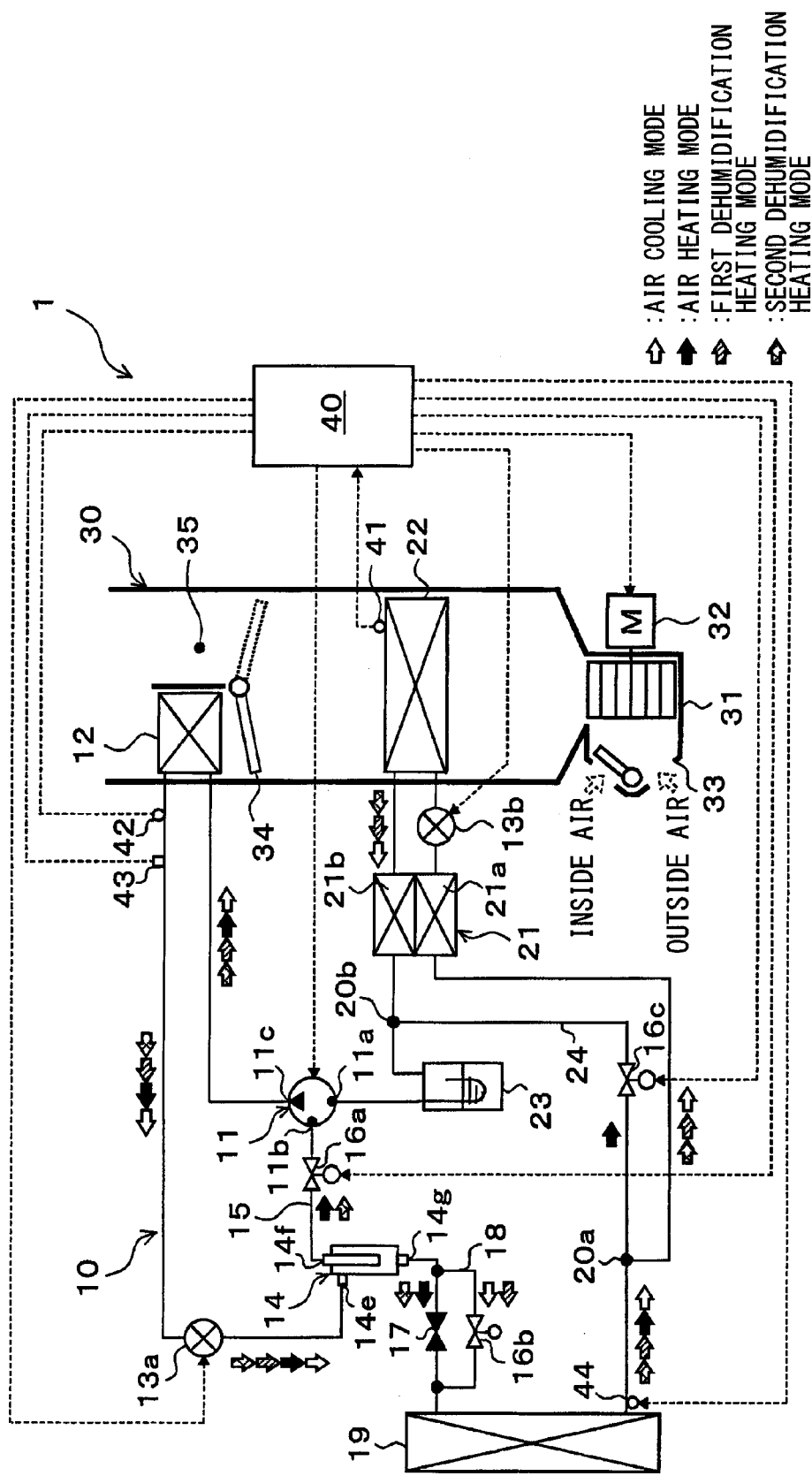
FIG. 1 is an entire configuration diagram of a vehicle air conditioner to which a refrigeration cycle device according to a first embodiment is applied.
Figure 2:
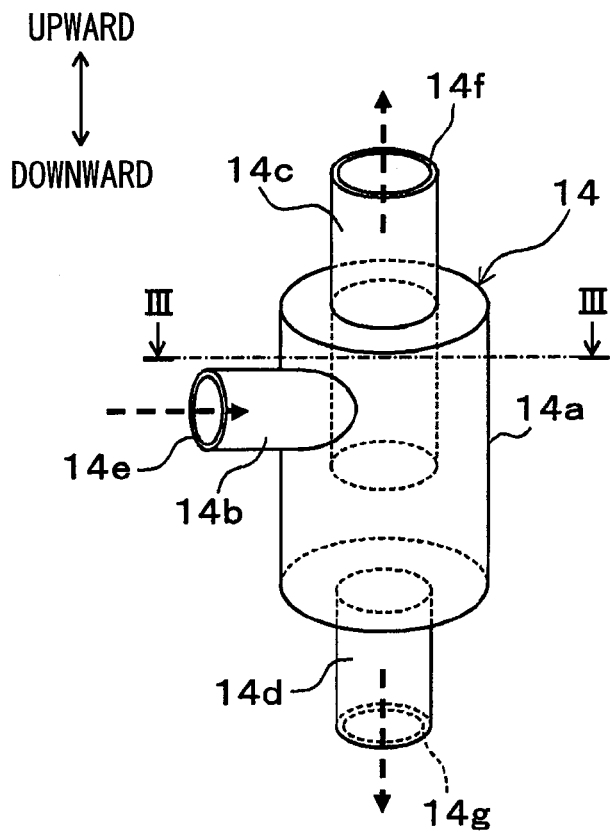
FIG. 2 is a perspective view of the appearance of a gas-liquid separator in the first embodiment.

Note that in FIG. 1, the flow of a refrigerant in the refrigerant circuit for the air cooling mode is indicated by open arrows; the flow of a refrigerant in the refrigerant circuit for the air heating mode is indicated by black arrows; the flow of a refrigerant in the refrigerant circuit for the first dehumidification heating mode is indicated by hatched arrows; and the flow of a refrigerant in the refrigerant circuit for the second dehumidification heating mode is indicated by crosshatched arrows.

The refrigeration cycle device 10 employs a hydrofluorocarbon (HFC) based refrigerant (for example, R134a) as the refrigerant, and constitutes a vapor-compression subcritical refrigeration cycle whose high-pressure side refrigerant pressure Pd does not exceed the critical pressure of the refrigerant. Obviously, a hydrofluoro-olefin (HFO) based refrigerant (for example, R1234yf) and the like may be used as the refrigerant. Refrigerating machine oil for lubricating a compressor 11 is mixed into the refrigerant, and part of the refrigerating machine oil circulates through the cycle together with the refrigerant.

The compressor 11 among the components of the refrigeration cycle device 10 is positioned within a bonnet of the vehicle, and is to suck, compress, and discharge the refrigerant in the refrigeration cycle device 10. More specifically, the compressor 11 is a two-stage boost electric compressor that accommodates two compression mechanisms and an electric motor rotatably driving both compression mechanisms, in a housing forming an outer envelope. The two compression mechanisms include a low-stage side compression mechanism and a high-stage side compression mechanism.

The housing of the compressor 11 is provided with a suction port 11a, an intermediate-pressure suction port 11b, and a discharge port 11c. The suction port 11a draws the low-pressure refrigerant from the outside of the housing into the low-stage side compression mechanism. The intermediate-pressure suction port 11b allows the intermediate-pressure refrigerant generated in the cycle to flow from the outside of the housing thereinto and to be then merged with the refrigerant being compressed from the low pressure state to the high pressure state. The discharge port 11c discharges the high-pressure refrigerant discharged from the high-stage side compression mechanism, to the outside of the housing.

More specifically, the intermediate-pressure suction port 11b is connected to the refrigerant discharge port side of the low-stage side compression mechanism (that is, the refrigerant suction port side of the high-stage side compression mechanism). Each of the low-stage side compression mechanism and the high-stage side compression mechanism can employ various types of compression mechanisms, such as a scroll type compression mechanism, a vane compression mechanism, and a rolling piston compression mechanism.

The electric motor has its operation (the number of revolutions) controlled by a control signal output from an air conditioning controller 40 to be described later. The electric motor may employ either an AC motor or a DC motor. The refrigerant discharge capacity of the compressor 11 is changed by control of the number of revolutions of the electric motor. Thus, in this embodiment, the electric motor serves as a discharge capacity changing portion for the compressor 11.

Although this embodiment employs the compressor 11 accommodating the two compression mechanisms in one housing, the form of the compressor is not limited thereto. That is, as long as the intermediate-pressure refrigerant can flow from the intermediate-pressure suction port 11b to be merged with the refrigerant being compressed from the low pressure to the high pressure, the compressor 11 may employ an electric compressor. The electric compressor is configured to accommodate within a housing, one fixed displacement compression mechanism and an electric motor for rotatably driving the compression mechanism.

Alternatively, a two-stage boost compressor may be formed of both a low-stage sidecompression device and a high-stage sidecompression device. These two compressors are connected in series. A suction port of the low-stage sidecompression device placed on a low-stage side is defined as the suction port 11a. A discharge port of the high-stage sidecompression device placed on a high-stage side is defined as the discharge port 11c. A connection portion for connecting a discharge port of the low-stage sidecompression device with a suction port of the high-stage sidecompression device is provided with the intermediate-pressure suction port 11b.

The discharge port 11c of the compressor 11 is connected to a refrigerant inlet side of an interior condenser 12. The interior condenser 12 is disposed in a casing 31 of an interior air conditioning unit 30 in the vehicle air conditioner 1 to be described later. The interior condenser 12 is a radiator that heats the ventilation air by exchanging heat between the high-temperature and high-pressure refrigerant discharged from the compressor 11 (specifically, the high-stage side compression mechanism), and the ventilation air having passed through an interior evaporator 22 to be described later.

A refrigerant outlet side of the interior condenser 12 is connected to an inlet side of a high-stage side expansion valve 13a. The high-stage side expansion valve 13a serves as a first decompression device that decompresses the high-pressure refrigerant flowing from the interior condenser 12 to the intermediate-pressure refrigerant. The high-stage side expansion valve 13a is an electric variable throttle mechanism that includes a valve body configured to be displaced so as to be capable of changing its throttle opening, and an electric actuator including a stepping motor that displaces the valve body.

The high-stage side expansion valve 13a includes the variable throttle with a fully opening function that serves as a mere refrigerant passage by fully opening its valve opening degree (throttle opening degree) mostly without exhibiting any refrigerant decompressing effect. Note that the high-stage side expansion valve 13a has its operation controlled by a control signal output from the air conditioning controller 40.

The outlet side of the high-stage side expansion valve 13a is connected to the refrigerant inlet of a gas-liquid separator 14, which serves as the gas-liquid separator that separates the refrigerant flowing out of the high-stage side expansion valve 13a into gas and liquid phase refrigerants. The detailed structure of the gas-liquid separator 14 will be described below using FIGS. 2 and 3. Note that the respective upward and downward arrows in FIG. 2 indicate respective upward and downward directions of the gas-liquid separator 14 mounted on the vehicle air conditioner 1.

The gas-liquid separator 14 includes a main body 14a, a refrigerant inflow port 14b, a gas-phase refrigerant outflow port 14c, a liquid-phase refrigerant outflow port 14d, and the like. The main body 14a has a substantially cylindrical hollow shape with its bottom (having a circular cross-sectional shape) extending in the vertical direction. The refrigerant inflow port 14b has a refrigerant inlet 14e for allowing the refrigerant flowing out of the high-stage side expansion valve 13a to flow thereinto. The gas-phase refrigerant outflow port 14c has a gas-phase refrigerant outlet 14f for allowing the separated gas-phase refrigerant to flow therefrom. The liquid-phase refrigerant outflow port 14d has a liquid-phase refrigerant outlet 14g for allowing the separated liquid-phase refrigerant to flow therefrom.

The refrigerant inflow port 14b is connected to the side surface of the cylindrical shape of the main body 14a. As shown in the cross-sectional view of FIG. 3, the refrigerant inflow port 14b includes a refrigerant pipe that extends along a tangential direction of the side surface of the cylindrical shape of the main body 14a.

The gas-phase refrigerant outflow port 14c is connected to an upper side end surface (upper surface) in an axis direction of the main body 14a. The gas-phase refrigerant outflow port 14c includes a refrigerant pipe that extends coaxially with the main body 14a across the inside and outside of the main body 14a. Further, the gas-phase refrigerant outlet 14f is formed at the upper side end of the gas-phase refrigerant outflow port 14c. The lower side end of the gas-phase refrigerant outflow port is positioned below a connection portion between the refrigerant inflow port 14b and the main body 14a.

The liquid-phase refrigerant outflow port 14d is connected to a lower side end surface (bottom surface) in an axis direction of the main body 14a. The liquid-phase refrigerant outflow port 14d includes a refrigerant pipe that extends coaxially with the main body 14a downward from the main body 14a. The liquid-phase refrigerant outlet 14g is formed at the lower side end of the liquid-phase refrigerant outflow port 14d.

Figure 3:
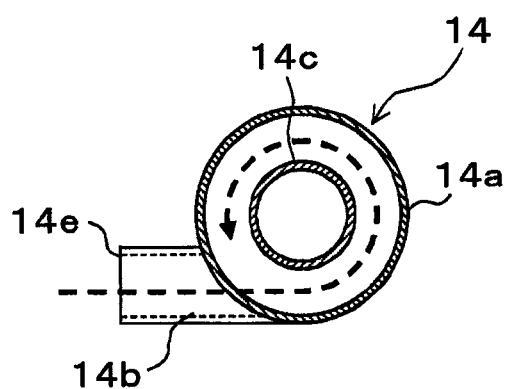
FIG. 3 is a cross-sectional view taken along the line III-III of the gas-liquid separator in the first embodiment.

Thus, as indicated by a thick dashed arrow of FIG. 3, the refrigerant flowing into the refrigerant inlet 14e of the refrigerant inflow port 14b swirls along an inner wall surface of the cylindrical shape of the main body 14a. The swirling flow causes the centrifugal force to act to separate the refrigerant into liquid and gas phase refrigerants. Further, the separated liquid-phase refrigerant falls downward of the main body 14a by the action of gravity.

The separated liquid-phase refrigerant falling downward is allowed to flow out of the liquid-phase refrigerant outlet 14g of the liquid-phase refrigerant outflow port 14d. The separated gas-phase refrigerant flows out of the gas-phase refrigerant outlet 14f of the gas-phase refrigerant outflow port 14c. That is, the gas-liquid separator 14 of this embodiment serves as a centrifugal gas-liquid separator that separates the refrigerant into the gas and liquid phase refrigerants by the action of the centrifugal force.

As shown in FIG. 1, the gas-phase refrigerant outlet 14f of the gas-liquid separator 14 is connected to the intermediate-pressure suction port 11b of the compressor 11 via a gas-phase refrigerant passage 15. The gas-phase refrigerant passage 15 is provided with a gas-phase refrigerant passage opening/closing valve 16a that serves as a gas-phase refrigerant passage opening/closing portion for opening and closing the gas-phase refrigerant passage 15. The gas-phase refrigerant passage opening/closing valve 16a is an electromagnetic valve having its operation controlled by a control voltage output from the air conditioning controller 40.

More specifically, when the air conditioning controller 40 opens the gas-phase refrigerant passage opening/closing valve 16a, the refrigeration cycle device is switched to a refrigerant circuit that guides the gas-phase refrigerant flowing out of the gas-phase refrigerant outlet 14f of the gas-liquid separator 14 to a side of the intermediate-pressure suction port 11b of the compressor 11. When the air conditioning controller 40 closes the gas-phase refrigerant passage opening/closing valve 16a, the refrigeration cycle device is switched to a refrigerant circuit that prevents the refrigerant from flowing out of the gas-phase refrigerant outlet 14f of the gas-liquid separator 14. Thus, the gas-phase refrigerant passage opening/closing valve 16a of this embodiment serves as a refrigerant circuit switching portion that switches the refrigerant circuit for circulation of the refrigerant through the cycle.

The gas-phase refrigerant passage opening/closing valve 16a also serves as a check valve that allows for the flow of only the refrigerant from the gas-phase refrigerant outlet of the gas-liquid separator 14 to the side of the intermediate-pressure suction port 11b of the compressor 11 when the gas-phase refrigerant passage 15 is open. Thus, when the gas-phase refrigerant passage opening/closing valve 16a opens the gas-phase refrigerant passage 15, the refrigerant is prevented from flowing backward from the side of the compressor 11 to the gas-liquid separator 14.

On the other hand, the liquid-phase refrigerant outlet 14g of the gas-liquid separator 14 is connected to the inlet side of an intermediate fixed throttle 17 that serves as a decompression device for decompressing the liquid-phase refrigerant separated by the gas-liquid separator 14. Examples of the intermediate fixed throttle 17 suitable for use can include a nozzle, an orifice, a capillary tube, etc., each having a fixed throttle opening. The outlet side of the intermediate fixed throttle 17 is connected to the refrigerant inlet side of an exterior heat exchanger 19.

The liquid-phase refrigerant outlet 14g of the gas-liquid separator 14 is connected to a fixed-throttle bypass passage 18 that guides the liquid-phase refrigerant separated by the gas-liquid separator 14 to the refrigerant inlet side of the exterior heat exchanger 19 while bypassing the intermediate fixed throttle 17. The fixed-throttle bypass passage 18 is provided with a bypass passage opening/closing valve 16b that opens and closes the fixed-throttle bypass passage 18. The bypass passage opening/closing valve 16b has the basic same structure as that of the gas-phase refrigerant passage opening/closing valve 16a.

A pressure loss caused when the refrigerant passes through the bypass passage opening/closing valve 16b is much smaller than that caused when the refrigerant passes through the intermediate fixed throttle 17. Thus, when the air conditioning controller 40 opens the bypass passage opening/closing valve 16b, the liquid-phase refrigerant leaving the gas-liquid separator 14 flows into the exterior heat exchanger 19 via the fixed-throttle bypass passage 18. On the other hand, when the air conditioning controller 40 closes the bypass passage opening/closing valve 16b, the liquid-phase refrigerant flowing out of the gas-liquid separator 14 is decompressed by the intermediate fixed throttle 17, and then flows into the exterior heat exchanger 19.

Alternatively, in place of the bypass passage opening/closing valve 16b, the refrigeration cycle device may employ an electric three-way valve. The electric three-way valve is adapted to switch between a refrigerant circuit for connecting the liquid-phase refrigerant outlet 14g of the gas-liquid separator 14 to the inlet side of the intermediate fixed throttle 17, and another refrigerant circuit for connecting the liquid-phase refrigerant outlet 14g of the gas-liquid separator 14 to the inlet side of the fixed-throttle bypass passage 18. Further, alternatively, a variable throttle mechanism with the fully opening function may be disposed in a refrigerant pipe leading from the liquid-phase refrigerant outlet 14g of the gas-liquid separator 14 to the refrigerant inlet side of the exterior heat exchanger 19, in place of the bypass passage opening/closing valve 16b, the intermediate fixed throttle 17, and the fixed-throttle bypass passage 18.

The exterior heat exchanger 19 is disposed in the bonnet and serves to exchange heat between the refrigerant flowing therethrough and the outside air blown from a blower fan (not shown). The exterior heat exchanger 19 serves to dissipate heat from the high-pressure refrigerant at least in the air cooling mode, and to evaporate the low-pressure refrigerant in the air heating mode.

The refrigerant outlet side of the exterior heat exchanger 19 is connected to a refrigerant inlet of a branch portion 20a that branches the flow of refrigerant discharged from the exterior heat exchanger 19. The branch portion 20a includes a three-way joint that has three inlet/outlet ports, one of which is the refrigerant inlet, and the remaining two of which are refrigerant outlets. Such a three-way joint may be formed by jointing pipes with different diameters, or by providing a plurality of refrigerant passages in a metal or resin block.

One of the refrigerant outlets of the branch portion 20a is connected to the refrigerant inlet side of a high-pressure side refrigerant passage 21a of an internal heat exchanger 21. Further, the outlet side of the high-pressure side refrigerant passage 21a of the internal heat exchanger 21 is connected to the refrigerant inlet side of the interior evaporator 22 via a low-stage side expansion valve 13b as the second decompression device.

The internal heat exchanger 21 exchanges heat between the refrigerant circulating through a refrigerant flow path leading from the refrigerant outlet side of the exterior heat exchanger 19 to the inlet side of the low-stage side expansion valve 13b, and the refrigerant circulating through another refrigerant flow path leading from the refrigerant outlet side of the interior evaporator 22 to the suction port 11a of the compressor 11.

Such an internal heat exchanger 21 can employ a double-pipe heat exchanger or the like that includes an outer pipe forming the high-pressure side refrigerant passage 21a for circulation of the refrigerant from the exterior heat exchanger 19, and an inner pipe disposed inside the outer pipe and forming a low-pressure side refrigerant passage 21b for circulation of the refrigerant from the interior evaporator 22.

Further, in this embodiment, a spiral groove is formed at the outer periphery of the inner pipe so as to be recessed toward the center of the inner pipe, thereby forming the spiral high-pressure side refrigerant passage 21a between the outer peripheral surface of the inner pipe and the inner peripheral surface of the outer pipe. Thus, in the air cooling mode, the passage cross-sectional area of the high-pressure side refrigerant passage 21a for the flow of the high-pressure refrigerant with a relatively high density can be set smaller than that of the low-pressure side refrigerant passage 21b for the flow of the low-pressure refrigerant with a relatively low density, thereby achieving the appropriate heat exchange.

The low-stage side expansion valve 13b is a second decompression device that decompresses the refrigerant flowing out of the high-pressure side refrigerant passage 21a of the internal heat exchanger 21 disposed on the downstream side of the refrigerant flow of the exterior heat exchanger 19. The low-stage side expansion valve 13b has the substantially same basic structure as that of the first decompression device. Thus, the low-stage side expansion valve 13b includes a variable throttle mechanism that has its operation controlled by a control signal output from the air conditioning controller 40.

The low-stage side expansion valve 13b also has a complete closing function of closing the refrigerant passage by completely closing the throttle opening of the valve body, thereby prohibiting the refrigerant from flowing downstream. That is, the low-stage side expansion valve 13b can close a refrigerant flow path leading from the outlet side of the high-pressure side refrigerant passage 21a of the internal heat exchanger 21 to the refrigerant inlet side of the interior evaporator 22.

The interior evaporator 22 is disposed on the upstream side of the ventilation air flow of the interior condenser 12 in the casing 31 of the interior air conditioning unit 30. The interior evaporator 22 is an evaporator that evaporates the low-pressure refrigerant by exchanging heat between the low-pressure refrigerant decompressed by the low-stage side expansion valve 13b and the ventilation air before being heated at the interior condenser 12 in the air cooling mode and the first and second dehumidification heating modes. In this way, the interior evaporator 22 exhibits the heat absorption effect to cool the ventilation air.

The refrigerant outlet of the interior evaporator 22 is connected to the refrigerant inlet side of the low-pressure side refrigerant passage 21b of the internal heat exchanger 21 described above. Further, the outlet side of the low-pressure side refrigerant passage 21b of the internal heat exchanger 21 is connected to the inlet side of an accumulator 23 via a merging portion 20b. The merging portion 20b is formed of the same type of three-way joint as the branch portion 20a. The three-way joint has three inlet and outlet ports, two of which are refrigerant inlets, and the remaining one of which is a refrigerant outlet.

The accumulator 23 is a gas-liquid separator that separates the refrigerant flowing thereinto, into liquid and gas phase refrigerants, and which stores therein the excessive refrigerant within the cycle. A gas-phase refrigerant outlet of the accumulator 23 is connected to the side of the suction port 11a of the compressor 11. Thus, the liquid-phase refrigerant is suppressed from being drawn into the compressor 11, whereby the liquid compression of the compressor 11 is suppressed.

The other refrigerant outlet of the branch portion 20a is connected to the other refrigerant inlet of the merging portion 20b via a low-pressure refrigerant passage 24. The low-pressure refrigerant passage 24 is a refrigerant passage that guides the refrigerant flowing out of the exterior heat exchanger 19 to the inlet side of the accumulator 23 while bypassing the internal heat exchanger 21, the low-stage side expansion valve 13b and the interior evaporator 22.

Further, a low-pressure refrigerant passage opening/closing valve 16c is disposed in the low-pressure refrigerant passage 24 so as to open and close the low-pressure refrigerant passage 24. The low-pressure refrigerant passage opening/closing valve 16c has the same basic structure as that of the gas-phase refrigerant passage opening/closing valve 16a.

More specifically, when the air conditioning controller 40 opens the low-pressure refrigerant passage opening/closing valve 16c and completely closes the low-stage side expansion valve 13b, the refrigeration cycle device is switched to a refrigerant circuit that allows the refrigerant leaving the exterior heat exchanger 19 to flow from the branch portion 20a to the side of the low-pressure refrigerant passage 24. When the air conditioning controller 40 closes the low-pressure refrigerant passage opening/closing valve 16c, and brings the low-stage side expansion valve 13b into a fully opened state or a throttle state of exhibiting the decompressing effect, the refrigeration cycle device is switched to a refrigerant circuit that allows the refrigerant leaving the exterior heat exchanger 19 to flow from the branch portion 20a to the side of the internal heat exchanger 21.

Thus, in this embodiment, the low-pressure refrigerant passage opening/closing valve 16c and the low-stage side expansion valve 13b constitutes the refrigerant circuit switching portion together with the above-mentioned gas-phase refrigerant passage opening/closing valve 16a. Note that when a variable throttle mechanism without the complete closing function is employed as the low-stage side expansion valve 13b, an opening/closing portion having the substantially same structure as the low-pressure refrigerant passage opening/closing valve 16c and the like may be disposed in a refrigerant leading from the branch portion 20a to the refrigerant inlet side of the interior evaporator 22.

In place of the low-pressure refrigerant passage opening/closing valve 16c and the branch portion 20a, an electric three-way valve or the like may be used. The electric three-way valve is designed to switch between a refrigerant circuit connecting the refrigerant outlet side of the exterior heat exchanger 19 to the merging portion 20b and another refrigerant circuit connecting the refrigerant outlet side of the exterior heat exchanger 19 to the inlet side of the high-pressure side refrigerant passage 21a of the internal heat exchanger 21.

Next, the interior air conditioning unit 30 will be described below. The interior air conditioning unit 30 serves to blow out the ventilation air whose temperature is adjusted by the refrigeration cycle device 10, into the vehicle compartment. The interior air conditioning unit 30 is disposed inside the dashboard (instrument panel) at the foremost part of the vehicle compartment. The interior air conditioning unit 30 accommodates a blower 32, the interior evaporator 22, the interior condenser 12, and the like in the casing 31 forming an outer envelope.

The casing 31 forms therein an air passage for ventilation air to be blown into the vehicle interior. The casing 31 has some elasticity, and is formed of resin (for example, polypropylene) having excellent strength. On the most upstream side of the ventilation air flow through the air passage formed in the casing 31, an inside/outside air switch 33 is provided to serve as inside/outside air switch for switching between inside air (air inside the vehicle compartment) and outside air (air outside the vehicle compartment) and introducing the air into the casing 31.

The inside/outside air switch 33 continuously adjusts opening areas of an inside air inlet for introducing the inside air into the casing 31 and an outside air inlet for introducing the outside air into the casing 31 by use of an inside/outside air switching door. In this way, the inside/outside air switch 33 is adapted to continuously change a ratio of the volume of the inside air to the outside air, which are to be introduced into the casing 31. The inside/outside air switching door is driven by an electric actuator for driving the inside/outside air switching door (not shown). The electric actuator has its operation controlled by a control signal output from the air conditioning controller 40.

On the downstream side of air flow of the inside/outside air switch 33, the blower 32 is provided for blowing air drawn thereinto via the inside/outside air switch 33 toward the vehicle interior. The blower 32 is an electric blower that drives a centrifugal multi-blade fan (sirrocco fan) by an electric motor. The blower 32 has the number of revolutions (i.e., air blowing volume) controlled by a control voltage output from the air conditioning controller 40.

The interior evaporator 22 and the interior condenser 12 mentioned above are disposed on the downstream side of the air flow of the blower 32 in this order with respect to the flow of the ventilation air. In short, the interior evaporator 22 is disposed on the upstream side of the ventilation air flow with respect to the interior condenser 12. A cool air bypass passage 35 is provided to allow the ventilation air having passed through the interior evaporator 22 to flow while bypassing the interior condenser 12 in the casing 31.

An air mix door 34 is disposed on the downstream side of the air flow of the interior evaporator 22 in the casing 31, and on the upstream side of the ventilation air flow of the interior condenser 12 and the cool air bypass passage 35. The air mix door 34 serves to adjust the ratio of the volume of air passing through the interior condenser 12 to that of air passing through the cool air bypass passage 35, of the ventilation air having passed through the interior evaporator 22.

On the downstream side of the ventilation air flow of the interior condenser 12 and the cool air bypass passage 35, a mixing space (not shown) is provided to mix the ventilation air heated by the interior condenser 12 and the ventilation air passing through the cool air bypass passage 35 and not heated by the interior condenser 12. Openings for blowing the ventilation air (conditioned air) mixed in the mixing space into the vehicle interior as a space to be air-conditioned are provided on the most downstream side of the ventilation air flow in the casing 31.

Specifically, the openings include a face air opening for blowing the conditioned air toward the upper body of a passenger in the vehicle compartment, a foot air opening for blowing the conditioned air toward the feet of the passenger, and a defroster air opening for blowing the conditioned air toward the inner side of a windshield of the vehicle (all these openings not being shown). A face air outlet, a foot air outlet, and a defroster air outlet (all these outlets not being shown) provided in the vehicle compartment are connected to the downstream sides of the ventilation air flows of the face opening, foot opening, and defroster opening via respective ducts forming the air passages, respectively.

Thus, the air mix door 34 adjusts the ratio of volume of air passing through the interior condenser 12 to that of air passing through the cool air bypass passage 35 to thereby adjust the temperature of conditioned air mixed in the mixing space, thus controlling the temperature of the conditioned air blown from each air outlet into the vehicle interior.

That is, the air mix door 34 serves as a temperature adjustment unit adapted to adjust the temperature of the conditioned air to be blown into the vehicle interior. The air mix door 34 is driven by an electric actuator for driving the air mix door (not shown). The electric actuator has its operation controlled by a control signal output from the air conditioning controller 40.

A face door for adjusting an opening area of the face air opening is positioned on the upstream side of the ventilation air flow of the face air opening; a foot door for adjusting an opening area of the foot air opening is positioned on the upstream side of the ventilation air flow of the foot air opening; and a defroster door for adjusting an opening area of the defroster air opening is positioned on the upstream side of the ventilation air flow of the defroster air opening (these doors being not shown).

These face door, foot door, and defroster door serve as air outlet mode switching portions for switching among air outlet modes. These doors are coupled to and rotated in cooperation with the electric actuator for driving an air outlet mode door (not shown) via a link mechanism or the like. Note that the electric actuator also has its operation controlled by a control signal output from the air conditioning controller 40.

Here, the air outlet modes switched by an air outlet mode switching portion specifically include a face mode, a bi-level mode, a foot mode, and a foot defroster mode. In the face mode, the face air outlet is fully opened to blow air from the face air outlet toward an upper half of the body of a passenger in the vehicle compartment. In the bi-level mode, both the face air outlet and foot air outlet are opened to blow the air toward the upper half of the body and the feet of the passenger in the vehicle compartment. In the foot mode, the foot air outlet is fully opened, and the defroster air outlet is opened only by a small opening degree to blow air mainly from the foot air outlet. In the foot defroster mode, the foot air outlet and the defroster air outlet are opened to the same degree to blow air from both the foot air outlet and the defroster air outlet.

Further, an air outlet mode selector switch provided in an operation panel is manually operated by the passenger, so that the defroster air outlet is fully open to enable setting of a defroster mode of blowing air from the defroster air outlet toward the inner face of the windshield of the vehicle.

Next, an electric controller of this embodiment will be described below. The air conditioning controller 40 is constructed of a known microcomputer, including CPU, ROM, RAM, and the like, and a peripheral circuit thereof. The air conditioning controller controls the operations of various air-conditioning control target devices (compressor 11, respective expansion valves 13a and 13b, respective opening/closing valves 16a to 16c, blower 32, and the like), which are connected to the output side of the controller, by performing various kinds of computations and processing based on air conditioning control programs stored in the ROM.

The input side of the air conditioning controller 40 is connected to a group of sensors for air-conditioning control, and receives detection signals input from the group of these sensors.

The group of sensors for air-conditioning control connected to the input side specifically includes an inside air sensor, an outside air sensor, a solar radiation sensor, an evaporator temperature sensor 41, a condenser outlet side refrigerant temperature sensor 42, a discharge pressure sensor 43, an external device temperature sensor 44, and a blown air temperature sensor. The inside air sensor detects a vehicle interior temperature Tr. The outside air sensor serves as an outside air temperature detector that detects an outside air temperature Tam. The solar radiation sensor detects a solar radiation amount As in the vehicle interior. The evaporator temperature sensor 41 serves as an evaporator blowing temperature detector that detects a blown air temperature (evaporator temperature) Te of the air from the interior evaporator 22. The condenser outlet side refrigerant temperature sensor 42 serves as a condenser outlet side refrigerant temperature detector that detects a condenser outlet side refrigerant temperature Tco of the refrigerant on the outlet side of the interior condenser 12. The discharge pressure sensor 43 serves as a discharge pressure detector that detects a high-pressure side refrigerant pressure Pd of a high-pressure refrigerant discharged from the compressor 11. The external device temperature sensor 44 serves as an external device temperature detector that detects an external device outlet side refrigerant temperature Ts of the refrigerant on the outlet side of the exterior heat exchanger 19. The blown air temperature sensor or the like serves as a blown air temperature detector that detects the blown air temperature (vehicle-interior blown air temperature) TAV of the air blown into the vehicle interior.

The evaporator temperature sensor 41 of this embodiment is adapted to detect the temperature of a heat exchanging fin of the interior evaporator 22. However, the evaporator temperature sensor 41 may adopt, as the evaporator temperature sensor, a temperature detector that detects the temperature of other parts of the interior evaporator 22. Alternatively, the evaporator temperature sensor 41 may adopt a temperature detector that detects the temperature of refrigerant circulating through the interior evaporator 22.

The external device temperature sensor 44 of this embodiment is adapted to detect the temperature of the refrigerant on the outlet side of the exterior heat exchanger 19. However, the external device temperature sensor 44 may adopt a temperature detector that detects the temperature of other parts of the exterior heat exchanger 19. Alternatively, the external device temperature sensor 44 may adopt a temperature detector that detects the temperature of refrigerant circulating through the exterior heat exchanger 19.

The input side of the air conditioning controller 40 is connected to an operation panel (not shown) that is disposed near an instrument board at the front of the vehicle compartment. Operation signals from various operation switches provided on the operation panel are input to the input side of the air conditioning controller.

Specifically, the various types of operation switches provided on the operation panel include an automatic switch, an air-cooling (A/C) switch, an air volume setting switch, a temperature setting switch, and a blow-out mode selector switch. The automatic switch is adapted to set or reset an automatic control operation of the vehicle air conditioner 1. The air-cooling (A/C) switch is adapted to set whether the air-cooling of the vehicle interior is performed or not. The air volume setting switch serves to manually set the volume of air from the blower 32. The temperature setting switch serves as a target temperature setting portion for setting a target temperature Tset of the vehicle interior. The blow-out mode selector switch serves to manually set a blow-out mode.

The air conditioning controller 40 is integrally structured with a control unit for controlling various air-conditioning control target devices connected to an output side of the controller. The control unit for controlling the operation of each of the control target devices may include a structure (hardware and software) that is adapted to control the operation of each of the control target devices.

For example, in this embodiment, a structure for controlling the operation of the electric motor in the compressor 11 constitutes a discharge capacity controller, and a structure for controlling the operations of the refrigerant flow path switching portions 16a and 16c constitutes a refrigerant flow path controller. It is obvious that the discharge capacity controller, the refrigerant flow path controller, and the like may be configured as another separate controller with respect to the air conditioning controller 40.

Next, the operation of the vehicle air conditioner 1 with the above arrangement in this embodiment will be described with reference to FIGS. 4 to 7. As mentioned above, the vehicle air conditioner 1 of this embodiment can perform the respective operations in the air cooling mode, the air heating mode, and further the first and second dehumidification heating modes. Switching between these operation modes is performed by executing an air conditioning control program pre-stored in the air conditioning controller 40.

Figure 4:
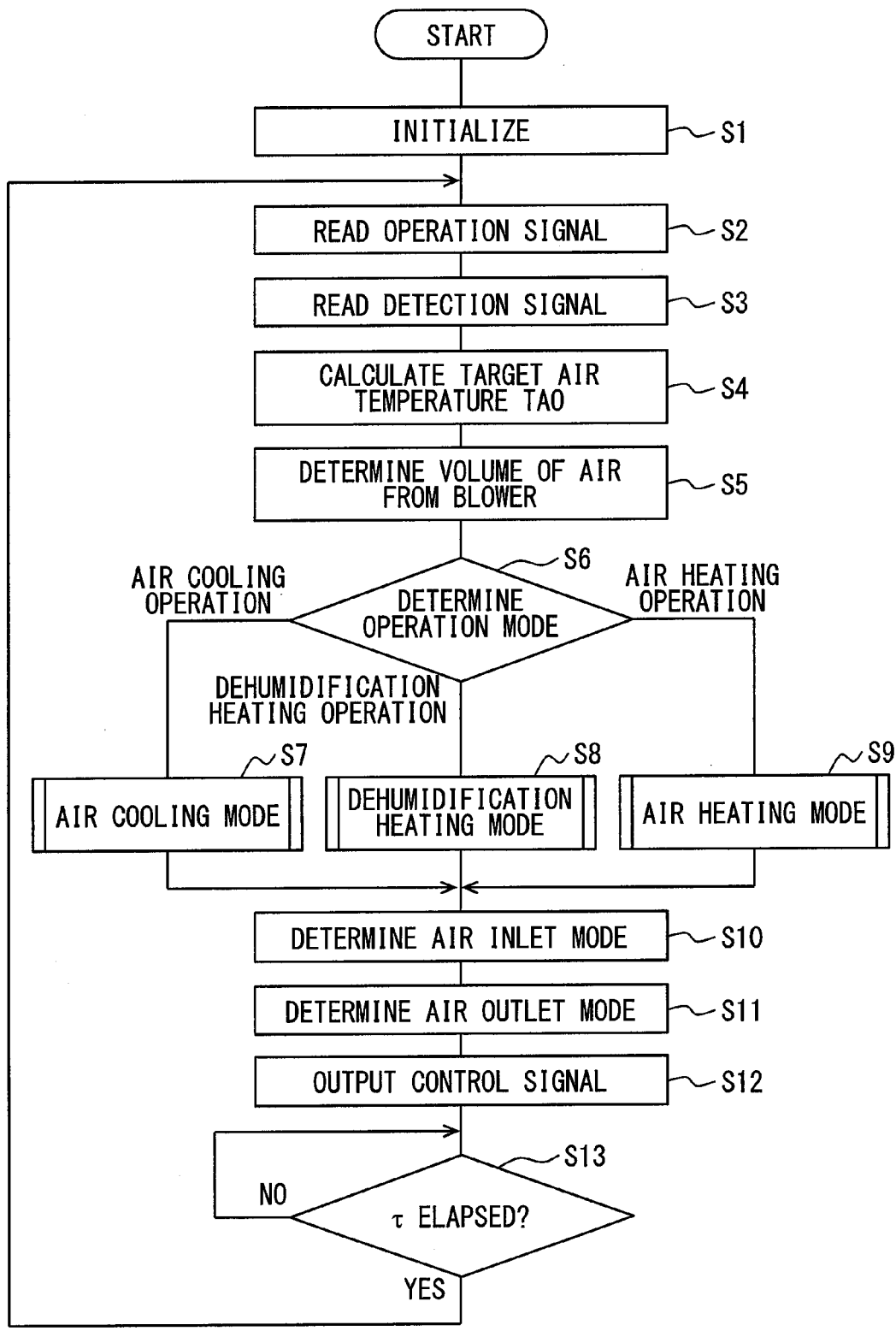
FIG. 4 is a flowchart showing a control process of the vehicle air conditioner in the first embodiment.

FIG. 4 is a flowchart showing a control process as a main routine of the air conditioning control program. The control process starts once the operation switch of the vehicle air conditioner 1 installed on the operation panel is turned on (ON). The control steps in the respective flowcharts of FIGS. 4 and 5 constitute various functional components included in the air conditioning controller 40.

First, in step S1, initialization of a flag, a memory, a timer, etc., of initial alignment of various air-conditioning control target devices, and the like is performed, and then the operation proceeds to step S2. In the initialization of step S1, a value stored at the end of the previous operation of the vehicle air conditioner 1 among the flags and memories is sometimes maintained.

In step S2, an operation signal is read from the operation panel. In the following step S3, a detection signal is read from the sensor group for the air-conditioning control, and then the operation proceeds to step S4. In step S4, a target air temperature TAO of the ventilation air to be blown into the vehicle interior is calculated based on the operation signal read in step S2 as well as the detection signal read in step S3.

Specifically, in step S4, the target air temperature TAO is calculated using the formula F1 below.

$$TAO = Kset \times Tset - Kr \times Tr - Kam \times Tam - Ks \times As + C \quad (F1)$$

wherein Tset is a vehicle interior preset temperature set by the temperature setting switch, Tr is a vehicle interior temperature (inside air temperature) detected by the inside air sensor, Tam is an outside air temperature detected by the outside air sensor, and As is a solar radiation amount detected by the solar radiation sensor. The Kset, Kr, Kam, and Ks are control gains, and C is a constant for correction.

In the following step S5, the blowing capacity (or the volume of air blown from) of the blower 32 is determined, and the operation proceeds to step S6. Specifically, in step S5, the volume of air from the blower 32 (in detail, a blower motor voltage to be applied to the electric motor) is determined with reference to the control map pre-stored in the air conditioning controller 40 based on the target air temperature TAO determined in step S4.

More specifically, in this embodiment, the blower motor voltage is set to a high level close to the maximum in an ultra-low temperature range and an ultra-high temperature range of the target air temperature TAO, whereby the volume of air blown from the blower 32 is controlled to be about the maximum level. As the target air temperature TAO is increased from the ultra-low temperature range to an intermediate temperature range, the blower motor voltage is decreased with increasing target air temperature TAO to thereby decrease the volume of air blown from the blower 32.

As the target air temperature TAO is decreased from the ultra-high temperature range to the intermediate temperature range, the blower motor voltage is decreased with decreasing target air temperature TAO to thereby decrease the volume of air blown from the blower 32. When the target air temperature TAO enters a predetermined intermediate temperature range, the blower motor voltage is minimized to thereby minimize the volume of air blown from the blower 32.

In step S6, an operation mode is determined based on the operation signal read in step S2 and the target air temperature TAO. Specifically, when the A/C switch is turned on (ON) and the target air temperature TAO is lower than a predetermined air-cooling reference temperature α, the operation mode is determined to be the air cooling mode in step S6. Then, the operation proceeds to step S7.

When the A/C switch is turned on (ON), and the target air temperature TAO is equal to or higher than the air-cooling reference temperature α, the operation mode is determined to be the dehumidification heating mode (specifically, either the first dehumidification heating mode or the second dehumidification heating mode) in step S6. Then, the operation proceeds to step S8.

When the A/C switch is turned off (OFF), the operation mode is determined to be the air heating mode in step S6, and then the operation proceeds to step S9. In steps S7 to S9, the control process corresponding to each of the operation modes is executed, and then the operation proceeds to step S10. The detailed contents of the control processes performed in the steps S7 to S9 will be described later.

In the following step S10, an air inlet mode, that is, the switching state of the inside/outside air switch 33 is determined, and then the operation proceeds to step S11. Specifically, in step S10, the air inlet mode is determined based on the target air temperature TAO with reference to the control map pre-stored in the air conditioning controller 40. In this embodiment, basically, an outside air mode for introducing the outside air has higher priority over other modes. However, when the target air temperature TAO becomes in the ultra-low temperature range, and the high air-cooling performance or the like is desired, an inside air mode is selected.

In step S11, an air outlet mode is determined, and then the operation proceeds to step S12. Specifically, in step S11, the air outlet mode is determined based on the target air temperature TAO with reference to the control map pre-stored in the air conditioning controller 40. In this embodiment, as the target air temperature TAO is decreased from the high temperature range to the low temperature range, the air outlet mode is switched from the foot mode to the bi-level mode and the face mode in this order.

In step S12, the control signal and control voltage are output to various control target devices connected to the output side of the air conditioning controller 40 so as to obtain the control state determined in the above steps S6 to S11. Then, in the following step S13, when a control cycle τ is determined to have elapsed after standby for the control cycle τ, the operation returns to step S2.

As mentioned above, the main routine shown in FIG. 4 includes reading the detection signal and the operation signal, determining the control state of each control target device, and outputting the control signal and the control voltage to the corresponding control target device. Such a main routine is repeatedly performed. The main routine is continuously executed until the operation of the vehicle air conditioner 1 is requested to stop (for example, the operation switch is turned OFF). Next, the processes in the respective operation modes performed in steps S7 to S9 will be described in detail.

(a) Air Cooling Mode

First, the air cooling mode performed in step S7 will be described. In the air cooling mode, the air conditioning controller 40 fully opens the high-stage side expansion valve 13a, brings the low-stage side expansion valve 13b into a throttle state, closes the gas-phase refrigerant passage opening/closing valve 16a, opens the bypass passage opening/closing valve 16b, and closes the low-pressure refrigerant passage opening/closing valve 16c.

Thus, as indicated by open arrows in FIG. 1, the refrigeration cycle device 10 in the air cooling mode is configured to allow the refrigerant to circulate through the compressor 11, the interior condenser 12, (the high-stage side expansion valve 13a, the gas-liquid separator 14, the fixed-throttle bypass passage 18), the exterior heat exchanger 19, the branch portion 20a, the high-pressure side refrigerant passage 21a of the internal heat exchanger 21, the low-stage side expansion valve 13b, the interior evaporator 22, the low-pressure side refrigerant passage 21b of the internal heat exchanger 21, the merging portion 20b, the accumulator 23, and the compressor 11 in this order.

With the above refrigerant circuit configuration, the operating states of the respective components of the refrigeration cycle device 10 are determined based on the target air temperature TAO calculated in the control step S4 and the detection signals from the sensor group.

For example, the control signal to be output to the electric motor of the compressor 11 is determined in the following way. First, a target evaporator outlet air temperature TEO of the interior evaporator 22 is determined based on the target air temperature TAO with reference to the control map pre-stored in the air conditioning controller 40. The target evaporator outlet air temperature TEO is determined to be a predetermined temperature (1° C. in this embodiment) or higher, which is higher than the frost formation temperature (0° C.) in order to prevent the frost formation (frost) at the interior evaporator 22.

Then, the number of revolutions of the compressor 11 is determined based on a deviation between the target evaporator outlet air temperature TEO and a blown air temperature (evaporator temperature) Te of the air blown from the interior evaporator 22 detected by the evaporator temperature sensor 41 as follows. Specifically, the number of revolutions of the compressor 11 is determined such that the blown air temperature Te of the air blown from the interior evaporator 22 approaches the target evaporator outlet air temperature TEO by using a feedback control method.

The control signal to be output to the low-stage side expansion valve 13b is determined such that a supercooling degree of the refrigerant flowing into the low-stage side expansion valve 13b approaches a target supercooling degree. The target supercooling degree is determined to substantially maximize the coefficient of performance (COP) of the cycle based on a condenser outlet side refrigerant temperature Tco detected by the condenser outlet side refrigerant temperature sensor 42 as well as the high-pressure side refrigerant pressure Pd detected by the discharge pressure sensor 43, with reference to the control map pre-stored in the air conditioning controller 40.

The control signal to be output to the electric actuator for driving the air mix door is determined such that the air mix door 34 closes an air passage on the side of the interior condenser 12, and that the whole amount of ventilation air having passed through the interior evaporator 22 can pass through the side of the cool air bypass passage 35. Note that in the air cooling mode, the opening degree of the air mix door 34 may be controlled such that the blown air temperature TAV approaches the target air temperature TAO. The control signal and the like determined in the way described above is output to each of the air-conditioning control target device in step S12 of the main routine.

Thus, in the refrigeration cycle device 10 under the air cooling mode, the high-temperature and high-pressure refrigerant discharged from the discharge port 11c of the compressor 11 flows into the interior condenser 12. At this time, the air mix door 34 closes an air passage of the interior condenser 12, so that the refrigerant flowing into the interior condenser 12 flows out of the interior condenser 12 while it hardly dissipates heat into the ventilation air.

The refrigerant flowing out of the interior condenser 12 flows into the exterior heat exchanger 19 through the high-stage side expansion valve 13a, the gas-liquid separator 14, and the fixed-throttle bypass passage 18 in this order. More specifically, since the high-stage side expansion valve 13a is fully open, the refrigerant flowing out of the interior condenser 12 flows into the gas-liquid separator 14 from the refrigerant inlet 14e of the gas-liquid separator 14 while it is hardly decompressed by the high-stage side expansion valve 13a.

At this time, in the interior condenser 12, the refrigerant hardly dissipates its heat into the ventilation air, whereby the refrigerant flowing into the gas-liquid separator 14 is brought into a gas-phase state. Thus, the gas-liquid separator 14 allows the gas-phase refrigerant to flow out of the liquid-phase refrigerant outlet 14g without separating the refrigerant into the gas and liquid phase refrigerants. Further, since the gas-phase refrigerant passage opening/closing valve 16a is closed, the refrigerant never flows out of the gas-phase refrigerant outlet 14f.

The gas-phase refrigerant flowing from the liquid-phase refrigerant outlet 14g of the gas-liquid separator 14 flows into the exterior heat exchanger 19 via the fixed-throttle bypass passage 18 as the bypass passage opening/closing valve 16b is open. The refrigerant flowing into the exterior heat exchanger 19 exchanges heat with the outside air blown from the blower fan to dissipate its heat therefrom, and thus is cooled down to have the target surpercooling degree.

The refrigerant flowing out of the exterior heat exchanger 19 flows into the high-pressure side refrigerant passage 21a of the internal heat exchanger 21 via the branch portion 20a as the low-pressure refrigerant passage opening/closing valve 16c is closed, and the low-stage side expansion valve 13b is brought into the throttle state. The high-pressure refrigerant flowing into the high-pressure side refrigerant passage 21a of the internal heat exchanger 21 exchanges heat with the low-pressure refrigerant circulating through the low-pressure side refrigerant passage 21b, further decreasing its enthalpy.

The refrigerant flowing out of the high-pressure side refrigerant passage 21a of the internal heat exchanger 21 flows into the low-stage side expansion valve 13b in the throttle state to be decompressed into the low-pressure refrigerant. Then, the low-pressure refrigerant decompressed by the low-stage side expansion valve 13b flows into the interior evaporator 22, and absorbs heat from the ventilation air blown from the blower 32 to evaporate itself. Thus, the ventilation air is cooled.

The refrigerant flowing out of the interior evaporator 22 flows into the low-pressure side refrigerant passage 21b of the internal heat exchanger 21, and exchanges heat with the refrigerant circulating through the high-pressure side refrigerant passage 21a, thus increasing its enthalpy. The refrigerant flowing out of the low-pressure side refrigerant passage 21b of the internal heat exchanger 21 flows into the accumulator 23 via the merging portion 20b to be separated into liquid and gas phase refrigerants. The gas-phase refrigerant separated by the accumulator 23 is drawn into the suction port 11a of the compressor 11 and compressed again by the low-stage side compression mechanism and the high-stage side compression mechanism.

As mentioned above, in the air cooling mode, the refrigeration cycle is configured such that the refrigerant dissipates heat at the exterior heat exchanger 19, and that the refrigerant evaporates at the interior evaporator 22, whereby the ventilation air cooled by the interior evaporator 22 can be blown into the vehicle interior. Thus, the cooling of the vehicle interior can be achieved. Note that since in the air cooling mode, the gas-phase refrigerant passage opening/closing valve 16a is closed, the compressor 11 serves as a single-stage booster compressor.

Further, in the air cooling mode, the refrigeration cycle device 10 of this embodiment is switched to the refrigerant circuit in which the internal heat exchanger 21 exchanges heat between the high-pressure refrigerant flowing out of the exterior heat exchanger 19 and the low-pressure refrigerant flowing out of the interior evaporator 22. Thus, a difference in enthalpy (refrigeration capacity) between the refrigerant on the outlet side of the interior evaporator 22 and the refrigerant on the inlet side thereof can be increased to improve the COP of the refrigeration cycle device 10.

(b) Air Heating Mode

Next, the air heating mode executed in step S9 will be described prior to the dehumidification heating mode. In the air heating mode, the air conditioning controller 40 brings the high-stage side expansion valve 13a into a throttle state, completely closes the low-stage side expansion valve 13b, opens the gas-phase refrigerant passage opening/closing valve 16a, closes the bypass passage opening/closing valve 16b, and opens the low-pressure refrigerant passage opening/closing valve 16c.

Thus, as indicated by black arrows of FIG. 1, the so-called gas injection cycle is configured in the refrigeration cycle device 10 under the air heating mode. In the gas injection cycle, the refrigerant circulates through the compressor 11, the interior condenser 12, the high-stage side expansion valve 13a, the gas-liquid separator 14, the intermediate fixed throttle 17, the exterior heat exchanger 19, the branch portion 20a, the low-pressure refrigerant passage 24, the merging portion 20b, the accumulator 23, and the compressor 11 in this order. At the same time, the gas-phase refrigerant flows from the gas-phase refrigerant outlet 14f of the gas-liquid separator 14 into the intermediate-pressure suction port 11b of the compressor 11.

With the above refrigerant circuit configuration, the operating states of the respective components of the refrigeration cycle device 10 are determined based on the target air temperature TAO and the detection signals from the sensor group.

For example, the control signal to be output to the electric motor of the compressor 11 is determined in the following way. First, a target high pressure Tpd of the high-pressure side refrigerant pressure Pd is determined based on the target air temperature TAO with reference to the control map pre-stored in the air conditioning controller 40. Based on a deviation between the target high pressure Tpd and the high-pressure side refrigerant pressure Pd, the number of revolutions of the compressor 11 is determined by using the feedback control method such that the high-pressure side refrigerant pressure Pd approaches the target high pressure Tpd.

The control signal to be output to the high-stage side expansion valve 13a is determined such that a supercooling degree of the refrigerant flowing into the high-stage side expansion valve 13a approaches the target supercooling degree. The control signal to be output to the electric actuator for driving the air mix door is determined such that the air mix door 34 closes an air passage on the side of the cool air bypass passage 35, and that the whole amount of ventilation air passing through the interior evaporator 22 can pass through the side of the interior condenser 12. The control signal or the like determined in the way described above is output to each of the air-conditioning control target devices in step S12 of the main routine.

Thus, in the refrigeration cycle device 10 under the air heating mode, the high-temperature and high-pressure refrigerant discharged from the discharge port 11c of the compressor 11 flows into the interior condenser 12. The refrigerant flowing into the interior condenser 12 exchanges heat with the ventilation air blown from the blower 32 and passing through the interior evaporator 22 to dissipate heat therefrom. Thus, the ventilation air is heated. The refrigerant flowing out of the interior condenser 12 is decompressed by the high-stage side expansion valve 13a into an intermediate-pressure refrigerant.

The intermediate-pressure refrigerant decompressed by the high-stage side expansion valve 13a flows into the gas-liquid separator 14 to be separated into the gas and liquid phase refrigerants. The gas-phase refrigerant separated by the gas-liquid separator 14 flows from the gas-phase refrigerant outlet 14f into the intermediate-pressure suction port 11b of the compressor 11 via the gas-phase refrigerant passage 15 because the gas-phase refrigerant passage opening/closing valve 16a is open. Then, the refrigerant flowing into the suction port 11b merges with the intermediate-pressure refrigerant discharged from the low-stage side compression mechanism to be drawn into the high-stage side compression mechanism.

On the other hand, the liquid-phase refrigerant separated by the gas-liquid separator 14 flows from the liquid-phase refrigerant outlet 14g into the side of the intermediate fixed throttle 17 because the bypass passage opening/closing valve 16b is closed. Then, the refrigerant is decompressed by the intermediate fixed throttle 17 into a low-pressure refrigerant. The refrigerant flowing out of the intermediate fixed throttle 17 flows into the exterior heat exchanger 19 and exchanges heat with the outside air blown from the blower fan to absorb heat from the outside air.

The refrigerant flowing out of the exterior heat exchanger 19 flows into the accumulator 23 via the branch portion 20a, the low-pressure refrigerant passage 24, and the merging portion 20b, because the low-pressure refrigerant passage opening/closing valve 16c is open, and the low-stage side expansion valve 13b is in the completely closed state. Then, the refrigerant is separated by the accumulator 23 into the liquid and gas phase refrigerants. The gas-phase refrigerant separated by the accumulator 23 is drawn into the suction port 11a of the compressor 11 and compressed again by the low-stage side compression mechanism and the high-stage side compression mechanism again.

As mentioned above, in the air heating mode, the refrigeration cycle is configured such that the refrigerant dissipates heat at the interior condenser 12, and that the refrigerant evaporates at the exterior heat exchanger 19, whereby the ventilation air heated by the interior condenser 12 can be blown into the vehicle interior. Thus, the heating of the vehicle interior can be achieved.

Further, in the air heating mode, the refrigeration cycle device 10 of this embodiment is switched to a refrigerant circuit that constitutes a gas injection cycle. In the gas injection cycle, the refrigerant is pressurized in multiple stages, and the intermediate-pressure refrigerant generated in the cycle is merged with the refrigerant discharged from the low-stage side compression mechanism to draw the merged refrigerant into the high-stage side compression mechanism. Thus, the mechanical efficiency (compression efficiency) of the compressor 11 can be enhanced to improve the COP.

(c) Dehumidification Heating Mode

Figure 5:
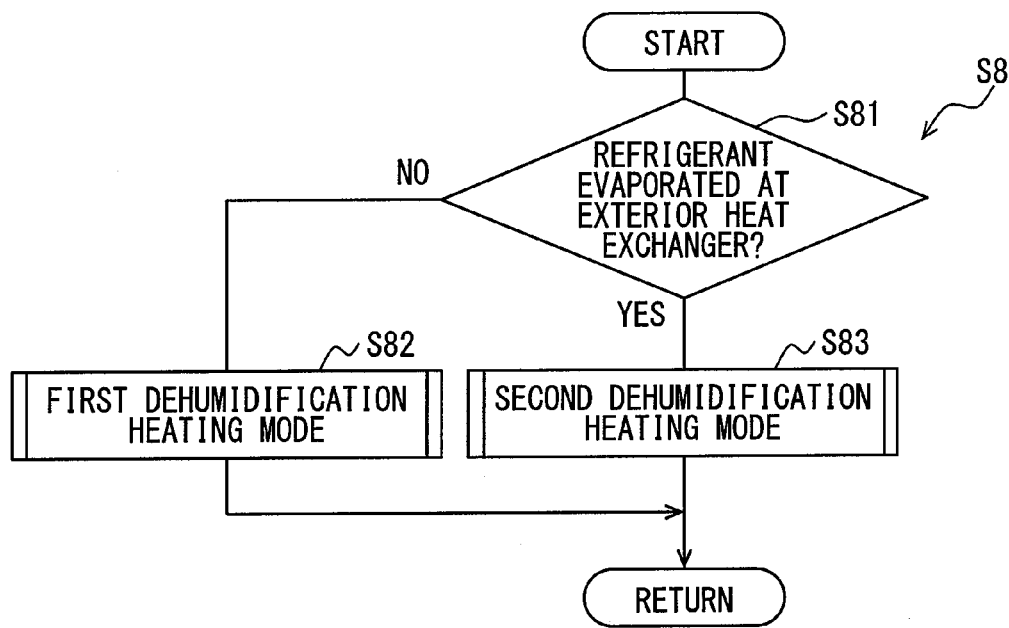
FIG. 5 is a flowchart showing a main part of the control process of the vehicle air conditioner in the first embodiment.

Next, the dehumidification heating mode performed in step S8 will be described. As mentioned above, the dehumidification heating mode of this embodiment includes the first dehumidification heating mode and the second dehumidification heating mode. Switching between the first dehumidification heating mode and the second dehumidification heating mode is performed by executing the control process in step S8 shown in FIG. 5. Note that the control process shown in FIG. 5 is executed as a sub-routine of the main routine described above.

First, in step S81, it is determined whether the refrigerant evaporates or not at the exterior heat exchanger 19. Specifically, in step S81, if the external device outlet side refrigerant temperature Ts detected by the external device temperature sensor 44 is lower than the outside air temperature Tam, the refrigerant is determined to evaporate at the exterior heat exchanger 19. Therefore, the control step S81 of this embodiment corresponds to an evaporation determining portion described in the appended claims.

If the refrigerant is determined not to evaporate at the exterior heat exchanger 19 in step S81, the operation proceeds to step S82, in which the operation mode is determined to be the first dehumidification heating mode, and then, the operation returns to the main routine. On the other hand, if the refrigerant is determined to evaporate at the exterior heat exchanger 19 in step S81, the operation proceeds to step S83, in which the operation mode is determined to be the second dehumidification heating mode, and then, the operation returns to the main routine. Now, the processes in the first and second dehumidification heating modes performed in steps S82 and S83 will be described in detail.

(c-1) First Dehumidification Heating Mode

In the first dehumidification heating mode, the air conditioning controller 40 brings the high-stage side expansion valve 13a and the low-stage side expansion valve 13b into throttle states, closes the gas-phase refrigerant passage opening/closing valve 16a, opens the bypass passage opening/closing valve 16b, and closes the low-pressure refrigerant passage opening/closing valve 16c.

Thus, as indicated by hatched arrows in FIG. 1, the refrigeration cycle device 10 in the first dehumidification heating mode is configured to allow the refrigerant to circulate through the compressor 11, the interior condenser 12, the high-stage side expansion valve 13a, (the gas-liquid separator 14, the fixed-throttle bypass passage 18), the exterior heat exchanger 19, the branch portion 20a, the high-pressure side refrigerant passage 21a of the internal heat exchanger 21, the low-stage side expansion valve 13b, the interior evaporator 22, the low-pressure side refrigerant passage 21b of the internal heat exchanger 21, the merging portion 20b, the accumulator 23, and the compressor 11 in this order.

With the above refrigerant circuit configuration, the operating states of the respective components of the refrigeration cycle device 10 are determined based on the target air temperature TAO calculated in the control step S4 and the detection signals from the sensor group. For example, the control signal to be output to the electric motor of the compressor 11 is determined in the same way as in the air cooling mode. A control signal to be output to the electric actuator for driving the air mix door is determined such that the blown air temperature TAV approaches the target air temperature TAO.

The high-stage side expansion valve 13a and the low-stage side expansion valve 13b are modified according to the target air temperature TAO. Specifically, as the target air temperature TAO increases, the throttle opening degree of the high-stage side expansion valve 13a is decreased, and the throttle opening degree of the low-stage side expansion valve 13b is increased. The control signal or the like determined in the way described above is output to each of various air-conditioning control target devices in the control step S12 of the main routine.

Figure 6:
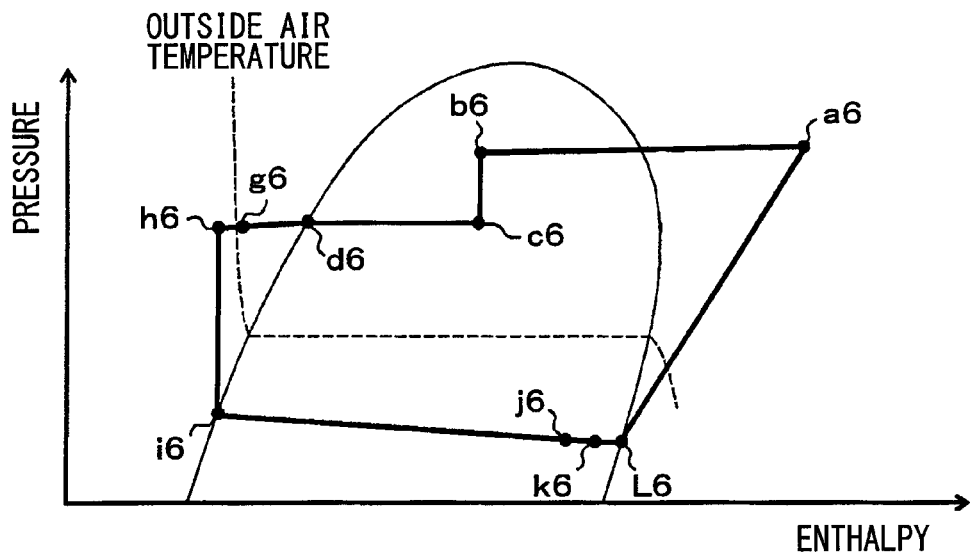
FIG. 6 is a Mollier chart showing the state of refrigerant in a first dehumidification heating mode of the refrigeration cycle device in the first embodiment.

Therefore, in the refrigeration cycle device 10 under the first dehumidification heating mode, as shown in the Mollier chart of FIG. 6, the high-temperature and high-pressure refrigerant discharged from the discharge port 11c of the compressor 11 (as indicated by a point a6 in FIG. 6) flows into the interior condenser 12 to exchange heat with part of the ventilation air cooled and dehumidified by the interior evaporator 22, thereby dissipating heat (as indicated from the point a6 to a point b6 in FIG. 6). Thus, the part of the ventilation air is heated, whereby the blown air temperature TAV approaches the target air temperature TAO.

The refrigerant flowing out of the interior condenser 12 flows into and is decompressed by the high-stage side expansion valve 13a (as indicated from the point b6 to a point c6 in FIG. 6). Here, in the first dehumidification heating mode, as can be seen from the description of the control step S81 constituting the evaporation determining portion, the throttle opening degree of the high-stage side expansion valve 13a is adjusted in such a range that the temperature of the refrigerant flowing out of the high-stage side expansion valve 13a is equal to or higher than the outside air temperature Tam.

The refrigerant flowing out of the high-stage side expansion valve 13a flows into the gas-liquid separator 14 to be separated into the gas and liquid phase refrigerants. At this time, in the first dehumidification heating mode, as the gas-phase refrigerant passage opening/closing valve 16a is closed, the separated gas-phase refrigerant is not allowed to flow out of the gas-phase refrigerant outlet 14f, while the separated liquid-phase refrigerant (as indicated by a point d6 of FIG. 6) flows out of the liquid-phase refrigerant outlet 14g, placing priority over the gas-phase refrigerant.

The refrigerant flowing out of the liquid-phase refrigerant outlet 14g of the gas-liquid separator 14 flows into the exterior heat exchanger 19 via the fixed-throttle bypass passage 18 as the bypass passage opening/closing valve 16b is open. The refrigerant flowing into the exterior heat exchanger 19 exchanges heat with the outside air blown from the blower fan to dissipate its heat therefrom (as indicated from the point d6 to a point g6 in FIG. 6).

The refrigerant flowing out of the exterior heat exchanger 19 flows into the high-pressure side refrigerant passage 21a of the internal heat exchanger 21 via the branch portion 20a as the low-pressure refrigerant passage opening/closing valve 16c is closed. The high-pressure refrigerant flowing into the high-pressure side refrigerant passage 21a of the internal heat exchanger 21 exchanges heat with the low-pressure refrigerant circulating through the low-pressure side refrigerant passage 21b, further decreasing its enthalpy (as indicated from the point g6 to a point h6 in FIG. 6).

The refrigerant flowing out of the high-pressure side refrigerant passage 21a of the internal heat exchanger 21 flows into the low-stage side expansion valve 13b in the throttle state to be decompressed into the low-pressure refrigerant (as indicated from the point h6 to a point i6 in FIG. 6). The low-pressure refrigerant decompressed by the low-stage side expansion valve 13b flows into the interior evaporator 22, and absorbs heat from the ventilation air blown from the blower 32 to evaporate itself (as indicated from the point i6 to a point j6 in FIG. 6). Thus, the ventilation air is cooled and dehumidified.

The refrigerant flowing out of the interior evaporator 22 flows into the low-pressure side refrigerant passage 21b of the internal heat exchanger 21, and exchanges heat with the refrigerant circulating through the high-pressure side refrigerant passage 21a, thus increasing its enthalpy (as indicated from the point j6 to a point k6 in FIG. 6). The refrigerant flowing out of the low-pressure side refrigerant passage 21b of the internal heat exchanger 21 flows into the accumulator 23 via the merging portion 20b to be separated into liquid and gas phase refrigerants.

The gas-phase refrigerant separated by the accumulator 23 (indicated by a point L6 in FIG. 6) is drawn into the suction port 11a of the compressor 11 and compressed again by the low-stage side compression mechanism and the high-stage side compression mechanism (as indicted from the point L6 to a point a6 in FIG. 6).

As mentioned above, in the first dehumidification heating mode, the refrigeration cycle is configured such that the refrigerant dissipates heat at the interior condenser 12 and the exterior heat exchanger 19, and that the refrigerant evaporates at the interior evaporator 22, whereby the ventilation air cooled and dehumidified by the interior evaporator 22 can be reheated by the interior condenser 12 and blown into the vehicle interior. Thus, the dehumidification and heating of the vehicle interior can be achieved.

(c-2) Second Dehumidification Heating Mode

In the second dehumidification heating mode, the air conditioning controller 40 brings the high-stage side expansion valve 13a into a throttle state, fully opens the low-stage side expansion valve 13b, opens the gas-phase refrigerant passage opening/closing valve 16a, closes the bypass passage opening/closing valve 16b, and closes the low-pressure refrigerant passage opening/closing valve 16c.

Thus, as indicated by crosshatched arrows of FIG. 1, a gas injection cycle is configured in the refrigeration cycle device 10 under the second dehumidification heating mode. In the gas injection cycle, the refrigerant circulates through the compressor 11, the interior condenser 12, the high-stage side expansion valve 13a, the gas-liquid separator 14, the intermediate fixed throttle 17, the exterior heat exchanger 19, the branch portion 20a, the high-pressure side refrigerant passage 21a of the internal heat exchanger 21, the low-stage side expansion valve 13b, the interior evaporator 22, the low-pressure side refrigerant passage 21b of the internal heat exchanger 21, the merging portion 20b, the accumulator 23, and the compressor 11 in this order. At the same time, the gas-phase refrigerant flows from the gas-phase refrigerant outlet 14f of the gas-liquid separator 14 into the intermediate-pressure suction port 11b of the compressor 11.

With the above refrigerant circuit configuration, the operating states of the respective components of the refrigeration cycle device 10 are determined based on the target air temperature TAO calculated in the control step S4 and the detection signals from the sensor group, like the first dehumidification heating mode. Then, the control signal or the like determined in the way described above is output to each of various air-conditioning control target devices in step S12 of the main routine.

Figure 7:
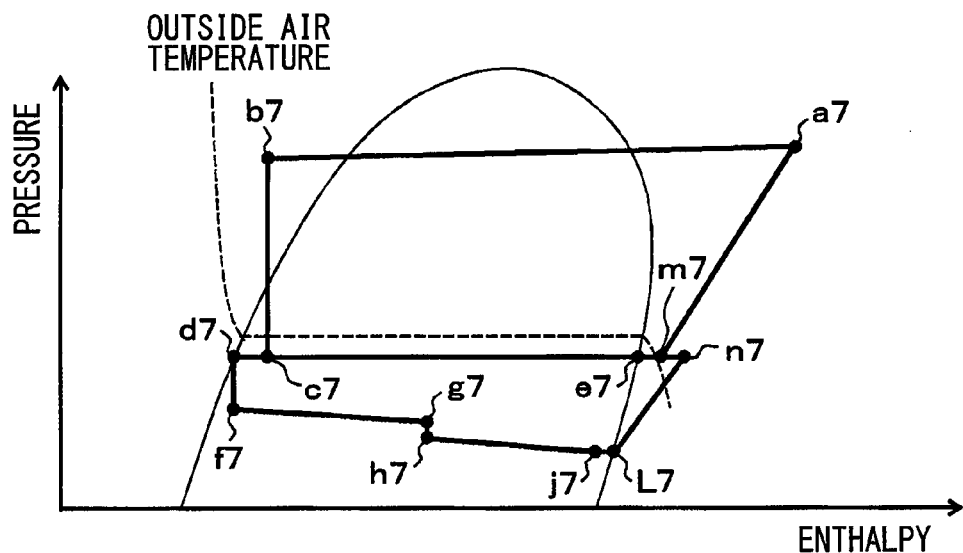
FIG. 7 is a Mollier chart showing the state of refrigerant in a second dehumidification heating mode of the refrigeration cycle device in the first embodiment.

Therefore, in the refrigeration cycle device 10 under the second dehumidification heating mode, as shown in the Mollier chart of FIG. 7, the high-temperature and high-pressure refrigerant discharged from the discharge port 11c of the compressor 11 (as indicated by a point a7 in FIG. 7) flows into the interior condenser 12 to exchange heat with part of the ventilation air cooled and dehumidified by the interior evaporator 22, thereby dissipating heat (as indicated from the point a7 to a point b7 in FIG. 7). Thus, the part of the ventilation air is heated, whereby the blown air temperature TAV approaches the target air temperature TAO.

The refrigerant flowing out of the interior condenser 12 flows into and is decompressed by the high-stage side expansion valve 13a (as indicated from the point b7 to a point c7 in FIG. 7). Here, in the second dehumidification heating mode, as can be seen from the description of the control step S81 constituting the evaporation determining portion, the throttle opening degree of the high-stage side expansion valve 13a is adjusted in such a range that the temperature of the refrigerant flowing out of the high-stage side expansion valve 13a is lower than the outside air temperature Tam.

This means that in the second dehumidification heating mode, the throttle opening degree of the high-stage side expansion valve 13a is decreased as compared to that in the first dehumidification heating mode at the same outside air temperature Tam. That is, the refrigeration cycle device 10 of this embodiment is configured such that the first dehumidification heating mode is shifted to the second dehumidification heating mode with increasing target air temperature TAO.

The refrigerant flowing out of the high-stage side expansion valve 13a flows into the gas-liquid separator 14 to be separated into the gas and liquid phase refrigerants (as indicated from the point c7 to a point e7, and from the point c7 to a point d7 in FIG. 7). The gas-phase refrigerant separated by the gas-liquid separator 14 (as indicated by the point e7 in FIG. 7) flows from the gas-phase refrigerant outlet 14f into the intermediate-pressure suction port 11b of the compressor 11 via the gas-phase refrigerant passage 15 because the gas-phase refrigerant passage opening/closing valve 16a is open. Then, the refrigerant flowing into the suction port 11b merges with the intermediate-pressure refrigerant discharged from the low-stage side compression mechanism to be drawn into the high-stage side compression mechanism (as indicated by a point m7 in FIG. 7).

On the other hand, the liquid-phase refrigerant separated by the gas-liquid separator 14 (as indicated by the point d7 in FIG. 7) flows from the liquid-phase refrigerant outlet 14g into the side of the intermediate fixed throttle 17 because the bypass passage opening/closing valve 16b is closed. Then, the refrigerant is decompressed and expanded by the intermediate fixed throttle 17 (as indicated from the point d7 to a point f7 in FIG. 7). The refrigerant flowing out of the intermediate fixed throttle 17 flows into the exterior heat exchanger 19 and exchanges heat with the outside air blown from the blower fan to absorb heat from the outside air (as indicated from the point f7 to a point g7 in FIG. 7).

The refrigerant flowing out of the exterior heat exchanger 19 flows into the high-pressure side refrigerant passage 21a of the internal heat exchanger 21 via the branch portion 20a as the low-pressure refrigerant passage opening/closing valve 16c is closed. At this time, since the low-stage side expansion valve 13b is fully open, a difference in temperature between the refrigerant flowing into the high-pressure side refrigerant passage 21a of the internal heat exchanger 21 and the refrigerant passing through the low-pressure side refrigerant passage 21b becomes relatively small.

Thus, the refrigerant flowing into the high-pressure side refrigerant passage 21a of the internal heat exchanger 21 has its pressure reduced by a pressure loss caused when passing through the high-pressure side refrigerant passage 21a, mostly without exchanging any heat with the refrigerant circulating through the low-pressure side refrigerant passage 21b (as indicated from the point g7 to a point h7 in FIG. 7), The refrigerant flowing out of the high-pressure side refrigerant passage 21a of the internal heat exchanger 21 flows into the interior evaporator 22 via the low-stage side expansion valve 13b. At this time, since the low-stage side expansion valve 13b is fully open, the refrigerant flowing out of the high-pressure side refrigerant passage 21a of the internal heat exchanger 21 flows into the interior evaporator 22 mostly without being decompressed by the low-stage side expansion valve 13b.

The refrigerant flowing into the interior evaporator 22 absorbs heat from the ventilation air blown from the blower 32 to evaporate itself (as indicated from the point h7 to a point j7 in FIG. 7). Thus, the ventilation air is cooled and dehumidified. The refrigerant flowing out of the interior evaporator 22 flows into the accumulator 23 via the low-pressure side refrigerant passage 21b of the internal heat exchanger 21 and the merging portion 20b, to be separated into liquid and gas phase refrigerants by the accumulator 23.

The gas-phase refrigerant separated by the accumulator 23 (as indicated by a point L7 in FIG. 7) is sucked into the suction port 11a of the compressor 11 and compressed by the low-stage side compression mechanism (as indicated from the point L7 to a point n7 of FIG. 7). The intermediate-pressure refrigerant compressed by the low-stage side compression mechanism of the compressor 11 merges with the gas-phase refrigerant (as indicated by the point e7 in FIG. 7) separated at the gas-liquid separator 14 (as indicated from the point n7 to the point m7, and from the point e7 to the point m7 in FIG. 7), to be decompressed by the high-stage side compression mechanism (as indicated from the point m7 to the point a7 in FIG. 7).

As mentioned above, in the second dehumidification heating mode, the refrigeration cycle is configured such that the refrigerant dissipates heat at the interior condenser 12, and that the refrigerant evaporates at the exterior heat exchanger 19 and the interior evaporator 22. In the refrigeration cycle, the ventilation air cooled and dehumidified by the interior evaporator 22 can be reheated by the interior condenser 12 and blown into the vehicle interior. Thus, the dehumidification and heating of the vehicle interior can be achieved.

Further, in the second dehumidification heating mode, the refrigeration cycle device 10 of this embodiment is switched to the refrigerant circuit constituting the gas injection cycle, and thus can improve the COP, like the air heating mode.

Accordingly, the vehicle air conditioner 1 of this embodiment is adapted to switch the refrigerant circuit of the refrigeration cycle device 10 as mentioned above to enable the air cooling, the air heating, and the dehumidification heating of the vehicle interior while exhibiting the high COP in the refrigeration cycle device 10, thereby achieving the comfortable air conditioning of the vehicle interior.

Further, the refrigeration cycle device 10 of this embodiment is adapted to switch from the first dehumidification heating mode to the second dehumidification heating mode with increasing target air temperature TAO. Thus, the refrigeration cycle device 10 can effectively improve the heating capacity for the ventilation air in the interior condenser 12 during the dehumidification heating of the vehicle interior.

When specifically referring to this, in the second dehumidification heating mode, the exterior heat exchanger 19 evaporates the refrigerant, so that the heat absorbed by the refrigerant from the outside air at the exterior heat exchanger 19 can be used to heat the ventilation air by means of the interior condenser 12. Thus, the second dehumidification heating mode can be expected to more effectively improve the heating capacity for the ventilation air than the first dehumidification heating mode.

However, suppose that a structure is configured to flow the refrigerant from the exterior heat exchanger 19 into the high-pressure side refrigerant passage 21a of the internal heat exchanger 21 like this embodiment. In the structure, the dryness of the refrigerant flowing out of the exterior heat exchanger 19 into the high-pressure side refrigerant passage 21a of the internal heat exchanger 21 might be increased when the refrigerant evaporates at the exterior heat exchanger 19, as compared to when the refrigerant dissipates heat at the exterior heat exchanger 19.

When the refrigerant having a high dryness flows into the high-pressure side refrigerant passage 21a of the internal heat exchanger 21, the pressure loss caused when the refrigerant circulates through the high-pressure side refrigerant passage 21a might be increased to make the refrigerant evaporation temperature at the exterior heat exchanger 19 higher than the refrigerant evaporation temperature at the interior evaporator 22.

When the refrigerant evaporation temperature at the exterior heat exchanger 19 is increased to reduce a difference between the outside air temperature Tam and the refrigerant evaporation temperature, the refrigerant cannot absorb the sufficient heat from the outside air in the exterior heat exchanger 19. As a result, there is apprehension that the heating capacity of the interior condenser 12 for the refrigerant cannot be improved even though the refrigerant evaporates at the exterior heat exchanger 19.

In addition, suppose that a structure is configured to control the refrigerant evaporation temperature at the interior evaporator 22 to be a temperature higher than the frost formation temperature, like this embodiment. In the structure, a difference between the outside air temperature Tam and the refrigerant evaporation temperature at the exterior heat exchanger 19 tends to be reduced, if the pressure loss is increased when the refrigerant circulates through the high-pressure side refrigerant passage 21a of the internal heat exchanger 21.

On the other hand, in the refrigeration cycle device 10 of this embodiment, the gas-liquid separator 14 is provided to connect the liquid-phase refrigerant outlet 14g of the gas-liquid separator 14 to the refrigerant inlet side of the exterior heat exchanger 19. Thus, the liquid-phase refrigerant separated by the gas-liquid separator 14 is allowed to flow into the exterior heat exchanger 19 in preference to the gas-phase refrigerant.

Thus, in the second dehumidification heating mode of evaporating the refrigerant at the exterior heat exchanger 19, the dryness of the refrigerant flowing out of the exterior heat exchanger 19 can be prevented from increasing, thereby suppressing an increase in pressure loss caused when the refrigerant flowing out of the exterior heat exchanger 19 circulates through the high-pressure side refrigerant passage 21a of the internal heat exchanger 21. Specifically, a difference in pressure represented by a difference between the point g7 and the point h7 as shown in the Mollier chart of FIG. 7 can be prevented from increasing.

Therefore, this embodiment can prevent the increase in refrigerant evaporation temperature at the exterior heat exchanger 19, thereby increasing the amount of heat absorbed by the refrigerant from the outside air in the exterior heat exchanger 19. As a result, in the second dehumidification heating mode, the heating capacity of the interior condenser 12 for the ventilation air can be effectively improved.

The refrigeration cycle device 10 of this embodiment employs the two-stage boost compressor that includes the low-stage side compression mechanism and the high-stage side compression mechanism as the compressor 11. At least in the second dehumidification heating mode, the gas-phase refrigerant passage opening/closing valve 16a opens the gas-phase refrigerant passage 15, so that the gas-phase refrigerant separated by the gas-liquid separator 14 can be guided to the intermediate-pressure suction port 11b of the compressor 11.

Therefore, in the second dehumidification heating mode, the gas-phase refrigerant is prevented from flowing out of the liquid-phase refrigerant outlet 14g of the gas-liquid separator 14 while being mixed with the liquid-phase refrigerant, which can more effectively suppress the increase in dryness of the refrigerant flowing out of the exterior heat exchanger 19.

When the refrigerant is determined to be evaporating at the exterior heat exchanger 19 in the control step S81 constituting the evaporation determining portion, the refrigeration cycle device 10 of this embodiment is adapted to open the gas-phase refrigerant passage opening/closing valve 16a. Thus, the refrigeration cycle device 10 can surely bring the refrigerant flowing into the exterior heat exchanger 19, into the liquid-phase state in the second dehumidification heating mode.

Specifically, in the control step S81 constituting the evaporation determining portion, when the external device outlet side refrigerant temperature Ts detected by the external device temperature sensor 44 is lower than the outside air temperature Tam, the refrigerant is determined to evaporate at the exterior heat exchanger 19. Thus, with the extremely simple structure, the evaporation of the refrigerant at the exterior heat exchanger 19 can be determined with high accuracy.

The refrigeration cycle device 10 of this embodiment can employ the variable throttle mechanism as the high-stage side expansion valve 13a to thereby reduce the throttle opening degree of the high-stage side expansion valve 13a with increasing target air temperature TAO in the first and second dehumidification heating modes.

Thus, in the first dehumidification heating mode, as the target air temperature TAO is increased, the temperature of refrigerant flowing into the exterior heat exchanger 19 can be decreased to reduce the amount of heat dissipated from the refrigerant at the exterior heat exchanger 19. As a result, the refrigerant pressure at the interior condenser 12 can be increased with increasing target air temperature TAO, thereby improving the heating capacity of the interior condenser 12 for the ventilation air.

Thus, in the second dehumidification heating mode, as the target air temperature TAO is increased, the refrigerant evaporation temperature at the exterior heat exchanger 19 can be decreased to increase the amount of heat absorbed by the refrigerant at the exterior heat exchanger 19. As a result, the amount of heat that can be used to heat the ventilation air at the interior condenser 12 can be increased with increasing target air temperature TAO, thereby improving the heating capacity of the interior condenser 12 for the ventilation air.

The refrigeration cycle device 10 of this embodiment can employ the variable throttle mechanism as the low-stage side expansion valve 13b to thereby fully open the low-stage side expansion valve 13b in the second dehumidification heating mode. Accordingly, this embodiment can suppress the increase of the difference between the refrigerant evaporation temperature at the exterior heat exchanger 19 and the refrigerant evaporation temperature at the interior evaporator 22 in the second dehumidification heating mode.

(Second Embodiment)

Figure 8:
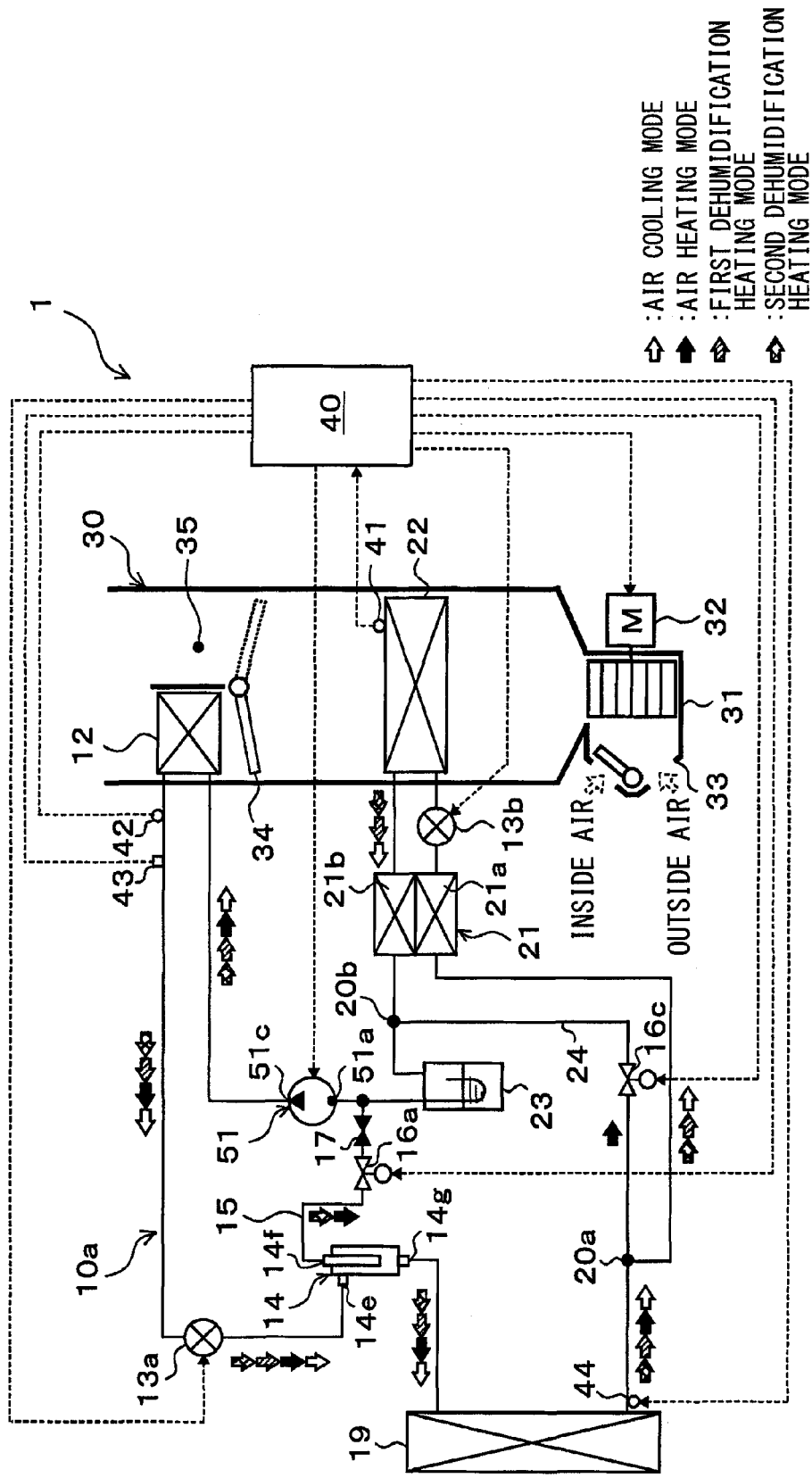
FIG. 8 is an entire configuration diagram of a vehicle air conditioner to which a refrigeration cycle device according to a second embodiment is applied.

This embodiment will describe an example in which the structure of the refrigeration cycle device in the first embodiment is changed to that of a refrigeration cycle device 10a, as illustrated in the entire configuration diagram of FIG. 8.

Specifically, the refrigeration cycle device 10a of this embodiment employs, as the compressor 51, a single-stage boost electric compressor that rotatably drives a fixed displacement compression mechanism by the electric motor to compress the refrigerant drawn from a suction port 51a, to discharge the compressed refrigerant from a discharge port 51c. The number of revolutions (refrigerant discharge capacity) of the compressor 51 is controlled by a control signal output from the air conditioning controller 40 in the same way as that of the compressor 11 in the first embodiment.

The gas-phase refrigerant passage 15 of this embodiment connects the gas-phase refrigerant outlet 14f of the gas-liquid separator 14 to the side of the suction port 51a of the compressor 51. Further, the refrigeration cycle device 10a abolishes the fixed-throttle bypass passage 18 and the bypass passage opening/closing valve 16b and places the intermediate fixed throttle 17 in the gas-phase refrigerant passage 15. The structures of other components in the second embodiment are the same as those in the first embodiment.

Next, the operation of the above-mentioned structure according to this embodiment will be described below. The basic operation of the vehicle air conditioner 1 in this embodiment is substantially the same as that in the first embodiment. Therefore, like the first embodiment, this embodiment performs the operations in the air cooling mode, the air heating mode, and the first and second dehumidification heating modes. Now, the respective operation modes will be described below.

(a) Air Cooling Mode

In the air cooling mode of this embodiment, the air conditioning controller 40 fully opens the high-stage side expansion valve 13a, brings the low-stage side expansion valve 13b into a throttle state, closes the gas-phase refrigerant passage opening/closing valve 16a, and closes the low-pressure refrigerant passage opening/closing valve 16c.

Thus, as indicated by open arrows in FIG. 8, the refrigeration cycle in the air cooling mode of this embodiment is configured to allow the refrigerant to circulate through the compressor 51, the interior condenser 12, (the high-stage side expansion valve 13a, the gas-liquid separator 14), the exterior heat exchanger 19, the branch portion 20a, the high-pressure side refrigerant passage 21a of the internal heat exchanger 21, the low-stage side expansion valve 13b, the interior evaporator 22, the low-pressure side refrigerant passage 21b of the internal heat exchanger 21, the merging portion 20b, the accumulator 23, and the compressor 51 in this order. That is, in the air cooling mode of the second embodiment, the substantially same refrigeration cycle as that in the air cooling mode of the first embodiment is configured.

The control signal to be output to the electric motor of the compressor 51, the control signal to be output to the low-stage side expansion valve 13b, and the control signal to be output to the electric actuator for driving the air mix door, and the like are determined in the same way as that in the air cooling mode of the first embodiment.

Therefore, like the air cooling mode of the first embodiment, in the air cooling mode of this embodiment, the air cooling of the vehicle interior can be achieved, and further the action of the internal heat exchanger 21 can improve the COP of the refrigeration cycle device 10.

(b) Air Heating Mode

In the air heating mode of this embodiment, the air conditioning controller 40 brings the high-stage side expansion valve 13a into a throttle state, completely closes the low-stage side expansion valve 13b, further opens the gas-phase refrigerant passage opening/closing valve 16a, and opens the low-pressure refrigerant passage opening/closing valve 16c.

Thus, in the air heating mode of this embodiment, as indicated by black arrows in FIG. 8, the refrigeration cycle is configured such that the refrigerant is allowed to circulate through the compressor 51, the interior condenser 12, the high-stage side expansion valve 13a, the gas-liquid separator 14, the exterior heat exchanger 19, the branch portion 20a, the low-pressure refrigerant passage 24, the merging portion 20b, the accumulator 23, and the compressor 51 in this order. At the same time, the refrigeration cycle is configured such that the gas-phase refrigerant is allowed to flow from the gas-phase refrigerant outlet 14f of the gas-liquid separator 14 into the side of the suction port 51a of the compressor 51 via the gas-phase refrigerant passage 15 and the intermediate fixed throttle 17.

The control signal to be output to the electric motor of the compressor 51, the control signal to be output to the low-stage side expansion valve 13b, and the control signal to be output to the electric actuator for driving the air mix door and the like are determined in the same way as that in the air heating mode of the first embodiment.

Therefore, in the air heating mode of this embodiment, like the air heating mode of the first embodiment, the high-temperature and high-pressure refrigerant discharged from the discharge port 51c of the compressor 51 flows into the interior condenser 12 and exchanges heat with the ventilation air blown from the blower 32 and passing through the interior evaporator 22 to dissipate heat therefrom. Thus, the ventilation air is heated.

The refrigerant flowing out of the interior condenser 12 is decompressed by the high-stage side expansion valve 13a into a low-pressure refrigerant, which flows into the gas-liquid separator 14. The gas-phase refrigerant separated by the gas-liquid separator 14 flows out toward the suction port 51a of the compressor 51 via the gas-phase refrigerant passage 15 and the intermediate fixed throttle 17 as the gas-phase refrigerant passage opening/closing valve 16a is open.

The liquid-phase refrigerant separated by the gas-liquid separator 14 flows into the exterior heat exchanger 19 and exchanges heat with the outside air blown from the blower fan to absorb heat from the outside air. The refrigerant flowing out of the exterior heat exchanger 19 flows into the accumulator 23 via the branch portion 20a, the low-pressure refrigerant passage 24, and the merging portion 20b, to be separated into liquid and gas phase refrigerants by the accumulator 23.

The gas-phase refrigerant separated by the accumulator 23 merges with the gas-phase refrigerant flowing out of the gas-liquid separator 14 toward the side of the suction port 51a of the compressor 51 via the gas-phase refrigerant passage 15 and the intermediate fixed throttle 17 to be drawn into the compressor 51.

As mentioned above, in the air heating mode of this embodiment, the refrigeration cycle is configured such that the refrigerant dissipates heat at the interior condenser 12, and that the refrigerant evaporates at the exterior heat exchanger 19, whereby the ventilation air heated by the interior condenser 12 can be blown into the vehicle interior. Thus, the heating of the vehicle interior can be achieved.

(c-1) First Dehumidification Heating Mode

In the first dehumidification heating mode of this embodiment, the air conditioning controller 40 brings the high-stage side expansion valve 13a and the low-stage side expansion valve 13b into throttle states, closes the gas-phase refrigerant passage opening/closing valve 16a, and closes the low-pressure refrigerant passage opening/closing valve 16c.

Thus, as indicated by hatched arrows in FIG. 8, the refrigeration cycle in the first dehumidification heating mode of this embodiment is configured to allow the refrigerant to circulate through the compressor 51, the interior condenser 12, the high-stage side expansion valve 13a, (the gas-liquid separator 14), the exterior heat exchanger 19, the branch portion 20a, the high-pressure side refrigerant passage 21a of the internal heat exchanger 21, the low-stage side expansion valve 13b, the interior evaporator 22, the low-pressure side refrigerant passage 21b of the internal heat exchanger 21, the merging portion 20b, the accumulator 23, and the compressor 51 in this order. That is, in the first dehumidification heating mode of this embodiment, the substantially same refrigeration cycle as that in the first dehumidification heating mode of the first embodiment is configured.

The control signal to be output to the electric motor of the compressor 51, the control signal to be output to the low-stage side expansion valve 13b, and the control signal to be output to the electric actuator for driving the air mix door and the like are determined in the same way as that in the first dehumidification heating mode of the first embodiment.

(c-2) Second Dehumidification Heating Mode

In the second dehumidification heating mode of this embodiment, the air conditioning controller 40 brings the high-stage side expansion valve 13a into a throttle state, fully opens the low-stage side expansion valve 13b, further opens the gas-phase refrigerant passage opening/closing valve 16a, and closes the low-pressure refrigerant passage opening/closing valve 16c.

Thus, as indicated by crosshatched arrows in FIG. 8, the refrigeration cycle in the second dehumidification heating mode of this embodiment is configured such that the refrigerant circulates through the compressor 51, the interior condenser 12, the high-stage side expansion valve 13a, the gas-liquid separator 14, the exterior heat exchanger 19, the branch portion 20a, the high-pressure side refrigerant passage 21a of the internal heat exchanger 21, the low-stage side expansion valve 13b, the interior evaporator 22, the low-pressure side refrigerant passage 21b of the internal heat exchanger 21, the merging portion 20b, the accumulator 23, and the compressor 51 in this order. At the same time, the refrigeration cycle is also configured such that the gas-phase refrigerant flows from the gas-phase refrigerant outlet 14f of the gas-liquid separator 14 into the side of the suction port 51a of the compressor 51 via the gas-phase refrigerant passage 15 and the intermediate fixed throttle 17.

The control signal to be output to the electric motor of the compressor 51, the control signal to be output to the low-stage side expansion valve 13b, and the control signal to be output to the electric actuator for driving the air mix door and the like are determined in the same way as that in the second dehumidification heating mode of the first embodiment.

Therefore, in the second dehumidification heating mode of this embodiment, like the second dehumidification heating mode of the first embodiment, the high-temperature and high-pressure refrigerant discharged from the discharge port 51c of the compressor 51 flows into the interior condenser 12 and exchanges heat with part of the ventilation air cooled and dehumidified by the interior evaporator 22 to dissipate heat therefrom. Thus, the part of the ventilation air is heated, whereby the blown air temperature TAV approaches the target air temperature TAO.

The refrigerant flowing out of the interior condenser 12 is decompressed by the high-stage side expansion valve 13a into a low-pressure refrigerant, which flows into the gas-liquid separator 14. The gas-phase refrigerant separated by the gas-liquid separator 14 flows out toward the side of the suction port 51a of the compressor 51 via the gas-phase refrigerant passage 15 and the intermediate fixed throttle 17 as the gas-phase refrigerant passage opening/closing valve 16a is open.

The liquid-phase refrigerant separated by the gas-liquid separator 14 flows into the exterior heat exchanger 19 and exchanges heat with the outside air blown from the blower fan to absorb heat from the outside air.

The refrigerant flowing out of the exterior heat exchanger 19 flows into the high-pressure side refrigerant passage 21a of the internal heat exchanger 21 via the branch portion 20a as the low-pressure refrigerant passage opening/closing valve 16c is closed.

At this time, since the low-stage side expansion valve 13b is fully open, a difference in temperature between the refrigerant flowing into the high-pressure side refrigerant passage 21a of the internal heat exchanger 21 and the refrigerant circulating through the low-pressure side refrigerant passage 21b thereof becomes relatively small. Thus, the refrigerant flowing into the high-pressure side refrigerant passage 21a of the internal heat exchanger 21 has its pressure reduced by a pressure loss caused when circulating through the high-pressure side refrigerant passage 21a, mostly without exchanging any heat with the refrigerant circulating through the low-pressure side refrigerant passage 21b.

The refrigerant flowing out of the high-pressure side refrigerant passage 21a of the internal heat exchanger 21 flows into the interior evaporator 22 via the low-stage side expansion valve 13b. At this time, since the low-stage side expansion valve 13b is fully open, the refrigerant flowing out of the high-pressure side refrigerant passage 21a of the internal heat exchanger 21 flows into the interior evaporator 22 mostly without being decompressed by the low-stage side expansion valve 13b.

The refrigerant flowing into the interior evaporator 22 absorbs heat from the ventilation air blown from the blower 32 to evaporate itself. Thus, the ventilation air is cooled and dehumidified. The refrigerant flowing out of the interior evaporator 22 flows into the accumulator 23 via the low-pressure side refrigerant passage 21b of the internal heat exchanger 21 and the merging portion 20b, to be separated into liquid and gas phase refrigerants by the accumulator 23. The operations following this step will be the same as those in the air heating mode.

As mentioned above, in the second dehumidification heating mode, the refrigeration cycle is configured such that the refrigerant dissipates heat at the interior condenser 12, and that the refrigerant evaporates at the exterior heat exchanger 19 and the interior evaporator 22. Thus, the refrigeration cycle can reheat the ventilation air cooled and dehumidified by the interior evaporator 22 by means of the interior condenser 12 to permit the reheated air to be blown into the vehicle interior. Thus, the dehumidification and heating of the vehicle interior can be achieved.

Accordingly, the vehicle air conditioner 1 in this embodiment is adapted to switch the refrigerant circuit of the refrigeration cycle device 10a as mentioned above to enable the air cooling, the air heating, and the dehumidification heating of the vehicle interior, thereby achieving the comfortable air conditioning of the vehicle interior.

Further, the refrigeration cycle device 10a of this embodiment can allow the liquid-phase refrigerant separated by the gas-liquid separator 14 to flow into the exterior heat exchanger 19 in the second dehumidification heating mode, thereby suppressing the increase of the dryness of the refrigerant flowing out of the exterior heat exchanger 19. Thus, in the second dehumidification heating mode, the heating capacity of the interior condenser 12 for the ventilation air can be effectively improved, like the first embodiment.

(Third Embodiment)

Figure 9:
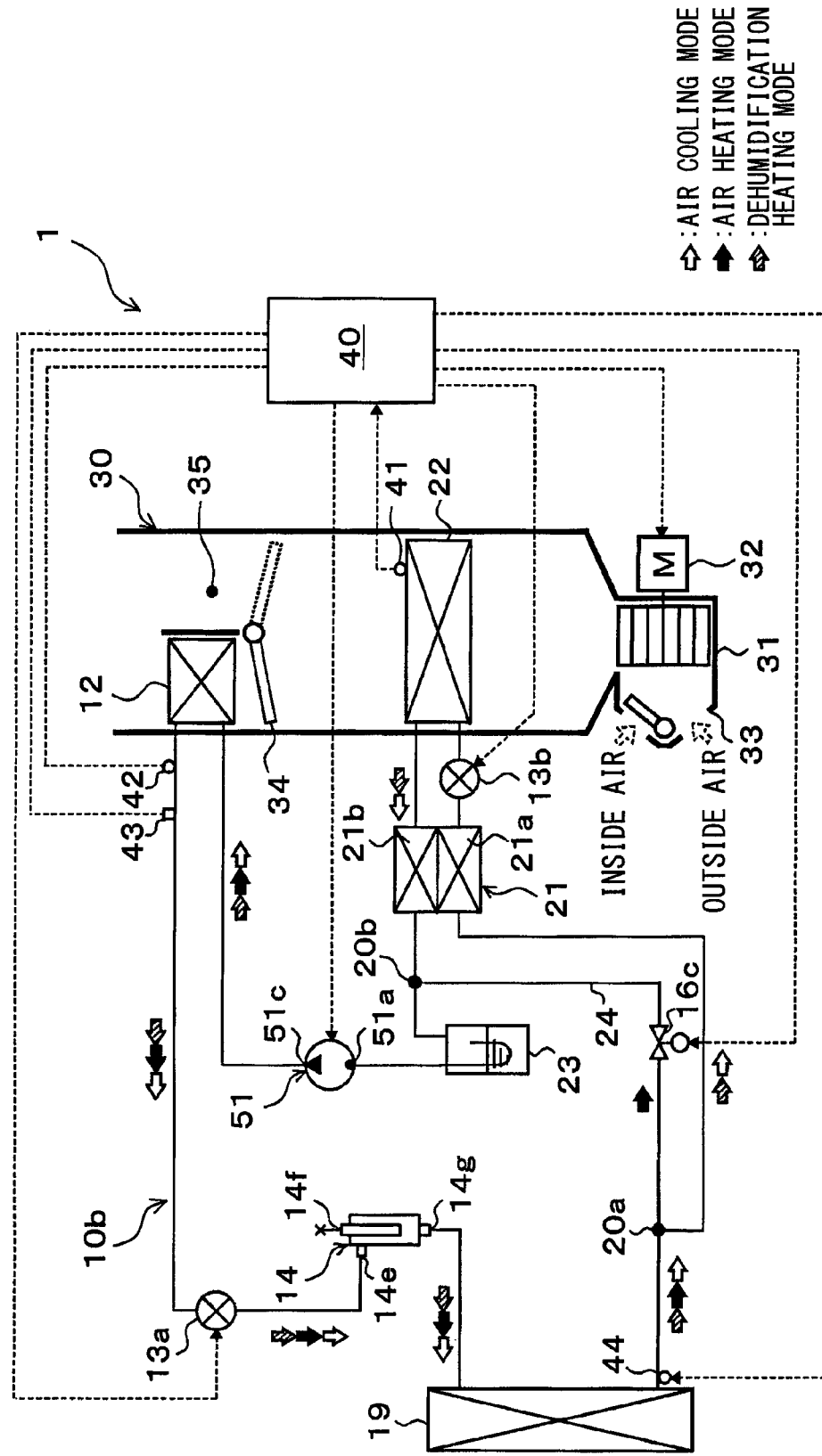
FIG. 9 is an entire configuration diagram of a vehicle air conditioner to which a refrigeration cycle device according to a third embodiment is applied.

This embodiment will describe an example in which the structure of the refrigeration cycle device 10 in the first embodiment is changed to that of a refrigeration cycle device 10b, as illustrated in the entire configuration diagrams of FIG. 9.

Specifically, the refrigeration cycle device 10b of this embodiment abolishes the gas-phase refrigerant passage 15, the gas-phase refrigerant passage opening/closing valve 16a, and the intermediate fixed throttle 17 from the refrigeration cycle device 10a of the second embodiment. Further, in this embodiment, the gas-phase refrigerant outlet 14f of the gas-liquid separator 14 is closed. The structures of other components in the third embodiment are the same as those in the first embodiment.

Next, the operation of the above-mentioned structure according to this embodiment will be described below. The basic operation of the vehicle air conditioner 1 in this embodiment is substantially the same as that in the first embodiment. Therefore, like the first embodiment, this embodiment performs the operations in the air cooling mode, the air heating mode, and the dehumidification heating mode. In this embodiment, the gas-phase refrigerant passage opening/closing valve 16a and the like is abolished, whereby the refrigerant circuit in the first dehumidification heating mode is equivalent to that in the second dehumidification heating mode.

(a) Air Cooling Mode

In the air cooling mode of this embodiment, the air conditioning controller 40 fully opens the high-stage side expansion valve 13a, brings the low-stage side expansion valve 13b into a throttle state, and closes the low-pressure refrigerant passage opening/closing valve 16c.

Thus, in the air cooling mode of this embodiment, as indicated by open arrows in FIG. 9, the refrigeration cycle is configured to allow for circulation of the refrigerant in the same order as that in the air cooling mode of the second embodiment, and can be operated in the same manner as that in the air cooling mode of the second embodiment. Thus, in the air cooling mode of this embodiment, the air cooling of the vehicle interior can be achieved in the same way as that in the air cooling mode of the second embodiment.

(b) Air Heating Mode

In the air heating mode of this embodiment, the air conditioning controller 40 brings the high-stage side expansion valve 13a into a throttle state, completely closes the low-stage side expansion valve 13b, and further opens the low-pressure refrigerant passage opening/closing valve 16c.

Thus, as indicated by black arrows in FIG. 9, the refrigeration cycle in the air heating mode of this embodiment is configured to allow the refrigerant to circulate through the compressor 51, the interior condenser 12, the high-stage side expansion valve 13a, the gas-liquid separator 14, the exterior heat exchanger 19, the branch portion 20a, the low-pressure refrigerant passage 24, the merging portion 20b, the accumulator 23, and the compressor 51 in this order.

The control signal to be output to the electric motor of the compressor 51, the control signal to be output to the low-stage side expansion valve 13b, and the control signal to be output to the electric actuator for driving the air mix door and the like are determined in the same way as that in the air heating mode of the first embodiment.

Therefore, in the air heating mode of this embodiment, the refrigeration cycle is configured such that the refrigerant dissipates heat at the interior condenser 12, and that the refrigerant evaporates at the exterior heat exchanger 19, whereby the ventilation air heated by the interior condenser 12 can be blown into the vehicle interior. Thus, the heating of the vehicle interior can be achieved.

(c) Dehumidification Heating Mode

In the dehumidification heating mode of this embodiment, the air conditioning controller 40 brings the high-stage side expansion valve 13a into a throttle state, brings the low-stage side expansion valve 13b into a throttle state or a fully opened state, and further opens the low-pressure refrigerant passage opening/closing valve 16c.

Thus, in the dehumidification heating mode of this embodiment, as indicated by hatched arrows in FIG. 9, the refrigeration cycle is configured to allow for the circulation of the refrigerant in the same order as the air cooling mode. The control signal to be output to the electric motor of the compressor 51, the control signals to be output to the high-stage side expansion valve 13a and the low-stage side expansion valve 13b, and the control signal to be output to the electric actuator for driving the air mix door and the like are determined in the same way as that in the air cooling mode of the first embodiment.

More specifically, in the dehumidification heating mode of this embodiment, as the target air temperature TAO is increased, the throttle opening degree of the high-stage side expansion valve 13a is reduced to decrease the temperature of the refrigerant flowing into the exterior heat exchanger 19. When the temperature of refrigerant flowing into the exterior heat exchanger 19 is equal to or higher than the outside air temperature Tam, the refrigeration cycle device is set in the first dehumidification heating mode. When the temperature of refrigerant flowing into the exterior heat exchanger 19 is lower than the outside air temperature Tam, the refrigeration cycle device is set in the second dehumidification heating mode.

Therefore, in the first dehumidification heating mode of this embodiment, the refrigeration cycle can be configured such that the refrigerant dissipates heat at the interior condenser 12 and the exterior heat exchanger 19, and that the refrigerant evaporates at the interior evaporator 22. Further, in the second dehumidification heating mode, the refrigeration cycle can be configured such that the refrigerant dissipates heat at the interior condenser 12, and that the refrigerant evaporates at the exterior heat exchanger 19 and the interior evaporator 22. Thus, the ventilation air cooled and dehumidified by the interior evaporator 22 is reheated by the interior condenser 12 to be blown into the vehicle interior, thereby enabling the dehumidification heating of the vehicle interior.

Accordingly, the vehicle air conditioner 1 in this embodiment is adapted to switch the refrigerant circuit of the refrigeration cycle device 10b as mentioned above to enable the air cooling, the air heating, and the dehumidification heating of the vehicle interior, thereby achieving the comfortable air conditioning of the vehicle interior.

Although the gas-phase refrigerant passage 15 for circulation of the gas-phase refrigerant separated by the gas-liquid separator 14 is abolished, the refrigeration cycle device 10b of this embodiment can permit the liquid-phase refrigerant separated by the gas-liquid separator 14 to flow into the exterior heat exchanger 19 in preference to the gas-phase refrigerant. Thus, in the second dehumidification heating mode, the heating capacity of the interior condenser 12 for the ventilation air can be effectively improved, like the first embodiment.

(Other Embodiments)

The present disclosure is not limited to the above embodiments, and various modifications and changes can be made to those embodiments in the following way without departing from the scope of the present invention.

(1) Although in the above-mentioned embodiments, the refrigeration cycle devices 10, 10a, and 10b according to the present disclosure are applied to air conditioners for hybrid vehicles by way of example, the application of the refrigeration cycle devices 10 to 10b is not limited thereto.

Alternatively, for example, the refrigeration cycle device of the present disclosure may be applied to air conditioners for electric vehicles (including fuel cell vehicles) that obtain driving force for traveling from electric motors for traveling, and normal vehicles that obtain driving force for traveling from internal combustion engines (engines).

In applying the refrigeration cycle device of the present disclosure to the vehicle with the internal combustion engine, a heater core may be provided in the vehicle air conditioner 1, as an air auxiliary heater to heat the ventilation air using a coolant of the internal combustion engine as a heat source. Further, the refrigeration cycle devices 10 to 10b according to the present disclosure are not limited to those dedicated for vehicles, and may be applied to a stationary air conditioner, a cooling storage, a liquid heating-cooling equipment, and the like.

(2) Although the centrifugal gas-liquid separator 14 is employed as the gas-liquid separator in the above embodiments by way of example, the gas-liquid separator is not limited thereto. For example, a gravity gas-liquid separator may be employed in which the gas-liquid two-phase refrigerant collides with a collision plate to be decelerated, causing the liquid-phase refrigerant with a higher density to fall downward so as to separate the refrigerant into gas and liquid phases refrigerants. Further, a surface tension gas-liquid separator or the like may be employed which separates the refrigerant into gas and liquid phase refrigerants by causing a liquid-phase refrigerant to adhere to an adhesive plate bent in a wave shape.

(3) In the above embodiments, in the control step S81 constituting the evaporation determining portion, when the external device outlet side refrigerant temperature Ts is lower than the outside air temperature Tam, the refrigerant is determined to evaporate at the exterior heat exchanger 19 by way of example. However, the evaporation determining portion is not limited thereto.

For example, when the throttle opening degree of the low-stage side expansion valve 13b is larger than the predetermined reference opening degree, the evaporation determining portion may determine that the refrigerant evaporates at the exterior heat exchanger 19. More specifically, the evaporation determining portion may be used which is designed to determine that the refrigerant evaporates at the exterior heat exchanger 19 when the low-stage side expansion valve 13b is fully open.

With this arrangement, in the dehumidification heating of the vehicle interior, as the target air temperature TAO is increased, the throttle opening degree of the high-stage side expansion valve 13a is decreased, and the throttle opening degree of the low-stage side expansion valve 13b is increased. When the low-stage side expansion valve 13b is brought into a throttle state, the refrigeration cycle device can be set in the first dehumidification heating mode. When the low-stage side expansion valve 13b is fully open, the refrigeration cycle device can be set in the second dehumidification heating mode.

(4) In the above-mentioned respective embodiments, the air conditioning control program is executed to switch among respective operating modes of the refrigeration cycle devices 10 to 10b based on the target air temperature TAO or the like by way of example. However, the switching among the respective operation modes is not limited thereto. For example, operation-mode setting switches may be provided on the operation panel to set the respective operation modes. In response to the operation signal from the operation-mode setting switch, switching may be performed among the air heating mode, the air cooling mode, and the first and second dehumidification heating mode.

(5) In the above-mentioned respective embodiments, the high-stage side expansion valve 13*a* and the low-stage side expansion valve 13*b* each including the variable throttle mechanism are employed as the first and second decompression devices, respectively, by way of example. However, each of the first and second decompression devices may employ a fixed throttle including a nozzle, an orifice, a capillary tube, or the like.

(6) In the above-mentioned respective embodiments, in the air heating mode and the air cooling mode, the air mix door 34 is operated to close either the air passage on the side of the interior condenser 12 or the cool air bypass passage 35 by way of example. However, the operation of the air mix door 34 is not limited thereto. That is, also in the air heating mode and the air cooling mode, like the first and second dehumidification heating modes, the opening degree of the air mix door 34 may be adjusted such that the blown air temperature TAV approaches the target air temperature TAO.

What is claimed is:

1. A refrigeration cycle device comprising:
   a compressor adapted to compress and discharge a refrigerant;
   a refrigerant radiator that exchanges heat between a high-pressure refrigerant discharged from the compressor and ventilation air to be blown into a space to be air-conditioned, to heat the ventilation air;
   a first decompression device adapted to decompress the refrigerant flowing out of the refrigerant radiator;
   an exterior heat exchanger that exchanges heat between the refrigerant downstream of the first decompression device and outside air;
   a second decompression device adapted to decompress the refrigerant flowing out of the exterior heat exchanger;
   an evaporator that exchanges heat between a low-pressure refrigerant on a downstream side of the second decompression device and the ventilation air before the refrigerant is heated by the refrigerant radiator, such that the evaporator cools the ventilation air;
   an internal heat exchanger that exchanges heat between the refrigerant circulating through a refrigerant flow path leading from a refrigerant outlet side of the exterior heat exchanger to an inlet side of the second decompression device, and the refrigerant circulating through another refrigerant flow path leading from a refrigerant outlet side of the evaporator to a side of a suction port of the compressor; and
   a gas-liquid separator that separates the refrigerant flowing out of the first decompression device into gas and liquid phase refrigerants, wherein
   a liquid-phase refrigerant outlet of the gas-liquid separator is connected to a refrigerant inlet side of the exterior heat exchanger, and
   the compressor includes a low-stage side compression mechanism that pressurizes a low-pressure refrigerant drawn from the suction port into an intermediate-pressure refrigerant, and a high-stage side compression mechanism that pressurizes the refrigerant drawn from an intermediate-pressure suction port and the refrigerant discharged from the low-stage side compression mechanism into a high-pressure refrigerant, the refrigeration cycle device further comprising:

a gas-phase refrigerant passage that guides a gas-phase refrigerant from a gas-phase refrigerant outlet of the gas-liquid separator to a side of the intermediate-pressure suction port;
   a gas-phase refrigerant passage opening/closing portion adapted to open and close the gas-phase refrigerant passage; and
   an evaporation determining portion that determines whether the refrigerant evaporates at the exterior heat exchanger, wherein
   the gas-phase refrigerant passage opening/closing portion opens the gas -phase refrigerant passage when the evaporation determining portion determines that the refrigerant evaporates at the exterior heat exchanger.

2. The refrigeration cycle device according to claim 1, further comprising:
   an exterior device temperature detector disposed to detect a temperature of the refrigerant circulating through the exterior heat exchanger; and
   an outside air temperature detector disposed to detect an outside air temperature, wherein
   the evaporation determining portion determines that the refrigerant evaporates at the exterior heat exchanger, when the temperature of the refrigerant circulating through the exterior heat exchanger is lower than the outside air temperature.

3. The refrigeration cycle device according to claim 1, wherein
   the second decompression device includes a variable throttle mechanism configured to have a variable throttle opening, and
   the evaporation determining portion determines that the refrigerant evaporates at the exterior heat exchanger, when a throttle opening of the second decompression device is larger than a predetermined reference opening.

4. The refrigeration cycle device according to claim 1, wherein the first decompression device includes a variable throttle mechanism configured to have a variable throttle opening.

5. A refrigeration cycle device comprising:
   a compressor adapted to compress and discharge a refrigerant;
   a refrigerant radiator that exchanges heat between a high-pressure refrigerant discharged from the compressor and ventilation air to be blown into a space to be air-conditioned, to heat the ventilation air;
   a first decompression device adapted to decompress the refrigerant flowing out of the refrigerant radiator;
   an exterior heat exchanger that exchanges heat between the refrigerant downstream of the first decompression device and outside air;
   a second decompression device adapted to decompress the refrigerant flowing out of the exterior heat exchanger;
   an evaporator that exchanges heat between a low-pressure refrigerant on a downstream side of the second decompression device and the ventilation air before the refrigerant is heated by the refrigerant radiator, such that the evaporator cools the ventilation air;
   an internal heat exchanger that exchanges heat between the refrigerant circulating through a refrigerant flow path leading from a refrigerant outlet side of the exterior heat exchanger to an inlet side of the second decompression device, and the refrigerant circulating through another refrigerant flow path leading from a refrigerant outlet side of the evaporator to a side of a suction port of the compressor;

a gas-liquid separator that separates the refrigerant flowing out of the first decompression device into gas and liquid phase refrigerants, wherein a liquid -phase refrigerant outlet of the gas-liquid separator is connected to a refrigerant inlet side of the exterior heat exchanger;

a gas-phase refrigerant passage that guides a gas-phase refrigerant from a gas-phase refrigerant outlet of the gas-liquid separator to a side of the suction port of the compressor;

a gas-phase refrigerant passage opening/closing portion adapted to open and close the gas-phase refrigerant passage; and an evaporation determining portion that determines whether the refrigerant evaporates at the exterior heat exchanger, wherein the gas-phase refrigerant passage opening/closing portion opens the gas -phase refrigerant passage when the evaporation determining portion determines that the refrigerant evaporates at the exterior heat exchanger.

6. The refrigeration cycle device according to claim 5, further comprising:

an exterior device temperature detector disposed to detect a temperature of the refrigerant circulating through the exterior heat exchanger; and an outside air temperature detector disposed to detect an outside air temperature, wherein the evaporation determining portion determines that the refrigerant evaporates at the exterior heat exchanger, when the temperature of the refrigerant circulating through the exterior heat exchanger is lower than the outside air temperature.

7. The refrigeration cycle device according to claim 5, wherein the second decompression device includes a variable throttle mechanism configured to have a variable throttle opening, and the evaporation determining portion determines that the refrigerant evaporates at the exterior heat exchanger, when a throttle opening of the second decompression device is larger than a predetermined reference opening.

8. The refrigeration cycle device according to claim 5, wherein the first decompression device includes a variable throttle mechanism configured to have a variable throttle opening.

* * * * *